United States Patent
Sasaoka et al.

(10) Patent No.: US 7,359,602 B2
(45) Date of Patent: Apr. 15, 2008

(54) OPTICAL TRANSMISSION LINE CONSTITUTING METHOD, OPTICAL TRANSMISSION LINE AND OPTICAL FIBER

(75) Inventors: Eisuke Sasaoka, Yokohama (JP);
Yoshinori Yamamoto, Yokohama (JP);
Kazunari Fujimoto, Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 10/532,708

(22) PCT Filed: Aug. 4, 2004

(86) PCT No.: PCT/JP2004/011164

§ 371 (c)(1),
(2), (4) Date: Apr. 27, 2005

(87) PCT Pub. No.: WO2005/012965

PCT Pub. Date: Feb. 10, 2005

(65) Prior Publication Data

US 2006/0056785 A1    Mar. 16, 2006

(30) Foreign Application Priority Data

Aug. 4, 2003 (JP) .............................. 2003-286118
Dec. 24, 2003 (JP) .............................. 2003-427765
Mar. 10, 2004 (JP) .............................. 2004-067801

(51) Int. Cl.
G02B 6/02 (2006.01)
G02B 6/16 (2006.01)

(52) U.S. Cl. ...................................... 385/123; 385/124

(58) Field of Classification Search ................. 385/123
See application file for complete search history.

(56) References Cited

U.S. PATENT DOCUMENTS 4,089,586 A    5/1978  French et al.

(Continued)

FOREIGN PATENT DOCUMENTS

EP    0862069 A2    9/1998

(Continued)

OTHER PUBLICATIONS

"Mixing TrueWave® RS Fiber with Other Single-Mode Fiber Designs Within a Network." OFS White Paper 1002-0702, pp. 1-7.

(Continued)

*Primary Examiner*—Frank G. Font
*Assistant Examiner*—Ryan Lepisto
(74) *Attorney, Agent, or Firm*—McDermott Will & Emery LLP

(57) ABSTRACT

The present invention relates to a method of forming a transmission line capable of measuring more precise connection losses at low cost, and so on. At least of first and second optical fibers to be connected as components of the optical transmission line is selected such that, at one wavelength $\lambda$ contained in the wavelength range of 1260 nm to 1625 nm, predetermined relationships defined by the Rayleigh scattering coefficients of the first and second optical fibers, the mode field diameters of the first and second optical fibers at the wavelength $\lambda$, and the transmission losses of the first and second optical fibers at the wavelength $\lambda$ can be satisfied between the first and second optical fibers.

27 Claims, 15 Drawing Sheets

U.S. PATENT DOCUMENTS

| | | | |
|---|---|---|---|
| 4,525,027 A | | 6/1985 | Okamoto et al. |
| 6,205,268 B1* | | 3/2001 | Chraplyvy et al. ............ 385/24 |
| 6,266,467 B1* | | 7/2001 | Kato et al. .................. 385/123 |
| 6,301,426 B1* | | 10/2001 | Jameson et al. ............ 385/140 |
| 6,345,140 B1* | | 2/2002 | Sasaoka et al. ............. 385/123 |
| 2002/0044753 A1* | | 4/2002 | Nagayama et al. ......... 385/123 |
| 2002/0176675 A1 | | 11/2002 | Oyamada |
| 2003/0147610 A1* | | 8/2003 | Tsukitani et al. ........... 385/127 |
| 2003/0174988 A1* | | 9/2003 | Bickham et al. ............ 385/127 |
| 2004/0033039 A1* | | 2/2004 | Oliveti et al. ............... 385/123 |
| 2004/0136668 A1* | | 7/2004 | Takahashi et al. .......... 385/123 |

FOREIGN PATENT DOCUMENTS

| | | |
|---|---|---|
| EP | 1146358 | 10/2001 |
| EP | 1247783 A2 | 10/2002 |
| EP | 1 329 750 A2 | 7/2003 |
| JP | 62-176941 | 8/1987 |
| JP | 1-224706 | 9/1989 |
| JP | 2-217329 | 8/1990 |
| JP | 11-326670 | 11/1999 |
| JP | 2002-303741 | 10/2002 |
| JP | 2002-303741 A | 10/2002 |
| JP | 2003-84163 | 3/2003 |
| JP | 2003-084163 A | 3/2003 |
| JP | 2003-511736 | 3/2003 |
| JP | 2003-511736 A | 3/2003 |
| JP | 2003-255169 | 9/2003 |
| WO | WO 00/31573 | 6/2000 |
| WO | WO 01/27667 A2 | 4/2001 |

OTHER PUBLICATIONS

"Corning® SMF-28e™ Optical Fiber Product Information." Issued Mar. 2003, pp. 1-4.

"AllWave® Fiber: The New Standard for Single-Mode Fiber!" OFS Leading Optical Innovation, pp. 1-6.

"Alcatel 6901 Enhanced Singlemode Fiber." Rev 0, Jan. 2002, pp. 1-2.

Nakahira, Mizuho., et al. "Measurement of Optical Fiber Loss and Splice Loss by Backscatter Method." The Transactions of the IECE of Japan, Oct. 1980, vol. E63, No. 10, pp. 762-767.

Nakahira, Mizuho., et al. "Measurement of Optical Fiber Loss by Backscatter Method." Technical Journal 1980, vol. 29, No. 11, pp. 1-9 (English Translation).

Lee, B.C., et al. "The Study on the Splice Loss Measurement by Uni-Directional OTDR and its Error Factors." Communication Cables and Related technologies, 1998, pp. 291-296.

US Office Action issued in U.S. Appl. No. 10/519,381, dated Sep. 28, 2006.

Nagayama et al.; "Ultra Low Loss (0.151 dB/km) Pure Silica Core fiber and Extension of Transmission Distance"; *Technical Report of IEICE*; c. 2002; pp. 1-6; vol. 102, No. 135; OCS2002-31; Japan, Abstract Only.

Nagayama et al.; Ultra-Low-Loss (0.1484 dB/km) Pure Silica Core Fibre and Extension of Transmission Distance; *Electronic Letters*; c. 2002; pp. 1168-1169; vol. 38, No. 20; Japan.

Specification for Low Water Peak Single-Mode Optical Fiber (G.652D); 6HF2-S-03216; c. 2003; pp. 1-3.

"Official Filing Receipt Enhances Performance of the First and Only Zero Water Peak Fiber"; *OFS News Press Release*; c. 2003.

"Enhanced Single Mode Fiber"; Alcatel 6901; c. 2002.

Yokota et al.; "Loss Characteristics of Ultralow-Loss Pure Silica Core Single-Mode Fiber"; *The Institute of Electronics and Communication Engineers of Japan*; c. 1986; pp. 4-262, Portion Only.

Nagayama et al.; "Ultra Low Loss (0.151 dB/km) Fiber and Its Impact on Submarine Transmission Systems"; *Optical Fiber Communication Conference*; c. 2002; pp. FA10-1-FA10-3.

M. Nakahira, et al. "Measurement of Optical Fiber Loss and Splice Loss by Backscatter Method," The Transactions of the IECE of Japan, Oct. 1980, vol. E63, No. 10, pp. 762-767.

M. Nakahira, et al. "Koho Sakuranho ni yoru Hikari Fiber no Sonshitsu Sokutel, " Electrical Communication Laboratories Technical Journal, 1980 Nen, vol. 29, No. 11, pp. 1851-1860, no translation.

B.C. Lee, et al. "The Study on the Splice Loss Measurement by Uni-Directional OTDR and its Error Factors," Communication Cables and Related Technologies, 1998, pp. 291-296.

US Office Action issued in U.S. Appl. No. 10/519,381, dated Sep. 28, 2006.

Nagayama et al.; "Ultra Low Loss (0.151 dB/km) Pure Silica Core fiber and Extension of Transmission Distance"; *Technical Report of IEICE*; c. 2002; pp. 1-6; vol. 102, No. 135; OCS2002-31; Japan.

Nagayama et al.; Ultra-Low-Loss (0.1484 dB/km) Pure Silica Core Fibre and Extension of Transmission Distance; *Electronic Letters*; c. 2002; pp. 1168-1169; vol. 38, No. 20; Japan.

"Corning® SMF-28e™ Optical Fiber Product Information." Issued Mar. 2003, pp. 1-4, previously submitted on Oct. 27, 2005.

Supplementary European Search Report issued in corresponding to European Patent Application No. 04771203.9-2216, dated on Apr. 11, 2007.

Voges, Petermann, "Optische Kommunikationstechnik", XP-002416368, pp. 56-131; Springer, Berlin.

Chinese Office Action, with English translation, issued in Chinese Patent Application No. CN 200480021839.8, mailed Jul. 6, 2007.

U.S. Office Action issued in Corresponding U.S. Appl. No. 10/519,381, dated on Oct. 9, 2007.

\* cited by examiner

Fig.3

| SAMPLE | A1 (dB/km·μm⁴) | A2 (dB/km·μm⁴) | A1−A2 (dB/km·μm⁴) | B1 (μm) | B2 (μm) | B2/B1 | K-VALUE (dB) |
|---|---|---|---|---|---|---|---|
| 1 | 1.07 | 0.94 | 0.13 | 10.35 | 10.10 | 0.98 | 0.17 |
| 2 | 0.94 | 0.87 | 0.07 | 10.35 | 10.10 | 0.95 | 0.06 |
| 3 | 1.12 | 0.94 | 0.18 | 10.35 | 9.80 | 0.95 | 0.14 |
| 4 | 1.10 | 0.94 | 0.16 | 10.35 | 9.60 | 0.93 | 0.01 |
| 5 | 1.13 | 0.94 | 0.19 | 10.35 | 9.80 | 0.95 | 0.15 |
| 6 | 0.98 | 0.87 | 0.11 | 10.40 | 9.80 | 0.94 | 0.01 |

| SAMPLE | A1 (dB/km·μm⁴) | A2 (dB/km·μm⁴) | A1−A2 (dB/km·μm⁴) | B1 (μm) | B2 (μm) | B2/B1 | ERROR OF MEASUREMENT (dB) |
|---|---|---|---|---|---|---|---|
| 7 | 1.06 | 0.94 | 0.12 | 10.35 | 10.21 | 0.98 | 0.19 |
| 8 | 0.92 | 0.87 | 0.05 | 10.35 | 10.10 | 0.95 | 0.01 |
| 9 | 1.10 | 0.94 | 0.16 | 10.35 | 10.03 | 0.97 | 0.19 |
| 10 | 1.07 | 0.94 | 0.13 | 10.35 | 9.93 | 0.96 | 0.09 |
| 11 | 1.11 | 0.94 | 0.17 | 10.35 | 9.99 | 0.97 | 0.20 |
| 12 | 1.08 | 0.94 | 0.14 | 10.35 | 9.89 | 0.96 | 0.09 |

Fig.5

| SAMPLE | α1 (dB/km) | α2 (dB/km) | α1−α2 (dB/km) | B1 (µm) | B2 (µm) | B2/B1 | K-VALUE (dB) |
|---|---|---|---|---|---|---|---|
| 13 | 0.325 | 0.305 | 0.020 | 9.13 | 8.61 | 0.94 | 0.11 |
| 14 | 0.339 | 0.309 | 0.031 | 8.95 | 8.55 | 0.96 | 0.01 |
| 15 | 0.339 | 0.307 | 0.032 | 9.20 | 8.40 | 0.91 | 0.17 |
| 16 | 0.353 | 0.315 | 0.037 | 9.13 | 8.61 | 0.94 | 0.01 |
| SAMPLE | α1 (dB/km) | α2 (dB/km) | α1−α2 (dB/km) | B1 (µm) | B2 (µm) | B2/B1 | ERROR OF MEARUREMENT (dB) |
| 17 | 0.339 | 0.317 | 0.022 | 9.20 | 8.50 | 0.92 | 0.19 |
| 18 | 0.339 | 0.315 | 0.024 | 9.15 | 8.65 | 0.95 | 0.08 |
| 19 | 0.339 | 0.314 | 0.025 | 9.10 | 8.40 | 0.92 | 0.17 |
| 20 | 0.339 | 0.312 | 0.027 | 9.05 | 8.60 | 0.95 | 0.04 |

Fig. 10

| | | SAMPLE A | COMPARATIVE EXAMPLE A |
|---|---|---|---|
| TRANSMISSION LOSS $\alpha_{1310}$ | (dB/km) | 0.29 | 0.33 |
| TRANSMISSION LOSS $\alpha_{1380}$ | (dB/km) | 0.27 | 0.62 |
| TRANSMISSION LOSS $\alpha_{1550}$ | (dB/km) | 0.17 | 0.19 |
| LOSS DIFFERENCE $\Delta\alpha$ (= $\alpha_{1550} - \alpha_{1310}$) | (dB/km) | 0.12 | 0.14 |
| OH-RELATED LOSS INCREASE $\Delta\alpha_{1380}$ | (dB/km) | 0.03 | 0.31 |
| CABLE CUTOFF WAVELENGTH | (nm) | 1220 | |
| ZERO DISPERSION WAVELENGTH | (nm) | 1310 | |
| MODE FIELD DIAMETER (AT WAVELENGTH OF 1550nm) | ($\mu$m) | 9.7 | |
| BENDING LOSS (AT WAVELENGTH OF 1550nm AND IN BENDING DIAMETER OF 20mm) | (dB/m) | 2 | |

Fig. 13

| | Δn (%) | 2a (μm) | CABLE CUTOFF WAVELENGTH (nm) | MFD AT WAVELENGTH OF 1310 nm (μm) | ZERO DISPERSION WAVELENGTH (nm) | CHROMATIC DISPERSION AT WAVELENGTH OF 1550 nm (ps/nm/km) | DISPERSION SLOPE AT WAVELENGTH OF 1550 nm (ps/nm²/km) | ZERO DISPERSION SLOPE (ps/nm²/km) | TRANSMISSION LOSS AT WAVELENGTH OF 1310 nm (dB/km) | TRANSMISSION LOSS AT WAVELENGTH OF 1380 nm (dB/km) | OH-RELATED LOSS INCREASE AT WAVELENGTH OF 1380 nm (dB/km) | TRANSMISSION LOSS AT WAVELENGTH OF 1550 nm (dB/km) | FIBER STRUCTURE (CORE MATERIAL /CLADDING MATERIAL) |
|---|---|---|---|---|---|---|---|---|---|---|---|---|---|
| SAMPLE B | 0.38 | 7.80 | 1166 | 8.53 | 1318 | 14.97 | 0.0540 | 0.0793 | ≤0.32 | ≤0.31 | ≤0.10 | ≤0.176 | PURE SILICA GLASS /F-DOPED GLASS |
| SAMPLE C | 0.935 | 8.16 | 1230 | 8.06 | 1313 | 15.46 | 0.0544 | 0.0806 | | | | | |
| SAMPLE D | 0.39 | 8.02 | 1200 | 8.57 | 1313 | 15.39 | 0.0537 | 0.0801 | | | | | |
| SAMPLE E | 0.395 | 7.56 | 1135 | 8.37 | 1318 | 14.86 | 0.0531 | 0.0789 | | | | | |
| SAMPLE F | 0.42 | 7.60 | 1260 | 8.33 | 1307 | 15.75 | 0.0536 | 0.0816 | | | | | |
| SAMPLE G | 0.385 | 8.14 | 1184 | 8.72 | 1312 | 15.90 | 0.0547 | 0.0800 | | | | | |
| SAMPLE H | 0.38 | 8.52 | 1226 | 8.92 | 1304 | 16.66 | 0.0548 | 0.0819 | | | | | |
| SAMPLE I | 0.36 | 8.10 | 1133 | 8.92 | 1317 | 15.39 | 0.0544 | 0.0790 | | | | | |
| COMPARATIVE EXAMPLE B | - | - | 1158 | 9.13 | 1316 | 16.50 | 0.0584 | 0.0850 | 0.33 | 0.62 | 0.31 | 0.19 | Ge-DOPED GLASS /PURE SILICA GLASS |

OPTICAL TRANSMISSION LINE CONSTITUTING METHOD, OPTICAL TRANSMISSION LINE AND OPTICAL FIBER

TECHNICAL FIELD

The present invention relates to an optical transmission line constituted by a plurality of optical fibers, an optical fiber applicable to the optical transmission line, and a method of forming the optical transmission line.

BACKGROUND ART

In an optical transmission system, signal light transmitted from an optical transmitter is transmitted through an optical transmission line constituted mainly by optical fibers. Then, the signal light arrives at an optical receiver and is received by that optical receiver. In such an optical transmission system, it is required that the optical characteristics of the optical transmission line laid between the optical transmitter and optical receiver be excellent in order to transmit mass information at high speed.

For example, in order to suppress the deterioration of signal light waveform caused by accumulated chromatic dispersion, in an optical transmission line formed by connecting an optical fiber for transmission with a dispersion compensation fiber, the absolute value of the accumulated chromatic dispersion in the overall optical transmission line is controlled smaller. On the other hand, in order to compensate for the loss of signal light suffered during the propagation in the optical fiber for transmission, in the optical transmission line formed by connecting the transmission optical fiber and an amplification optical fiber, the signal light is amplified in the amplification optical fiber. In addition, there are some cases that the foregoing dispersion compensating fiber and the amplification optical fiber are laid in a repeating section, while there are some cases to be installed in repeater stations and so on as a module rolled in a coil form.

Also, when an optical transmission line is changed or extended, there are some cases that another optical fiber is further connected to existing optical fibers.

In the optical transmission line thus formed by connecting a plurality of optical fibers, excellent optical characteristics of the overall optical transmission line are not only required, but also the small loss (connection loss) of a connecting point between the optical fibers constructing the optical transmission line is required. It is noted that the connection loss can be determined by an OTDR (Optical Time Domain Reflectometer) test.

In the OTDR test, a pulse test light is incident from one end of an optical transmission line, and a rear scattering light generated at each position while the pulse test light propagates through the optical transmission line is detected at the one end. Then, based on the time variation of the intensity of the rear scattering light, the distribution of the loss in the longitudinal direction of the optical transmission line will be obtained.

In this way, when the two optical fibers are connected with each other, the intensities of the scattering light at the front and rear of the connecting point are measured by the OTDR test. Then, a small difference between these intensities of the scattering light is judged a favorable connecting work. On the other hand, the large difference between these intensities of the scattering light is judged a failed connecting work, resulting in making the connecting work again.

Non-Patent Document 1: OFS, "Mixing TrueWaveR RS Fiber with Other Single-Mode Fiber Designs Within a Network," (retrieval on Feb. 27, 2004), available at the website of OFS Laboratories, Georgia.

DISCLOSURE OF THE INVENTION

Problems to be Solved by the Invention

After studying a conventional optical transmission line constituted by a plurality of optical fibers, the inventors have found out the following problems. Namely, in a case where a pulse test light is incident from a first end of an optical transmission line adapted by connecting a plurality of optical fibers for the purpose of improvement of the characteristics, even when a difference between the intensities of the scattering light obtained by the OTDR test is small, there are some cases that an actual value of the connection loss is large; on the contrary, even when the difference between the intensities of the scattering light is large, there are some cases that an actual value of the connection loss is small. This is because an error is contained in the measurement value $\beta 1$ of the connection loss that is determined by the difference between the intensities of the scattering light where the pulse test light is incident upon the optical transmission line from the first end of the optical transmission line.

For this reason, in order to obtain a more precise measurement value of the connection loss, the measurement value $\beta 2$ of the connection loss is also determined, as is determined from the difference between the intensities of the scattering light where the pulse test light is incident upon the optical transmission line from the second end of the optical transmission line; then the connection loss is determined as a average value of $\beta 1$ and $\beta 2$ ($=(\beta 1+\beta 2)/2$). A more accurate connection loss $\beta$ can be obtained by taking an average value (Non-Patent Document 1). However, in this case, there is a problem that apparatuses for the OTDR test have to be installed on the respective sides of the two ends of the optical transmission line, resulting in high system costs and further taking a long time for these measurements.

The present invention is made to solve the aforementioned problems, and it is an object to provide a method of forming an optical transmission line capable of measuring more precise connection losses at low cost, such an optical transmission line and an optical fiber applicable to the optical transmission line.

Means for Solving the Problem

A method of forming an optical transmission line according to the present invention is a method that forms the optical transmission line by a first optical fiber and a second optical fiber satisfying a predetermined relationship. In addition, the optical transmission line includes the first optical fiber and second optical fiber satisfying a predetermined relationship. At one wavelength $\lambda$ contained in the wavelength range of 1260 nm to 1625 nm, the Rayleigh scattering coefficient of the first optical fiber is A1, the mode field diameter of the first optical fiber is B1, the transmission loss of the first optical fiber is $\alpha 1$, the Rayleigh scattering coefficient of the second optical fiber is A2, the mode field diameter of the second optical fiber is B2, and the transmission loss of the second optical fiber is $\alpha 2$.

It is noted that the above wavelength range of 1260 nm to 1625 nm includes the O-band (1260 nm to 1360 nm), E-band (1360 nm to 1460 nm), S-band (1460 nm to 1530 nm), C-band (1530 nm to 1565 nm) and L-band (1565 nm to 1625 nm).

The parameter K represented by the following equations (1a) to (1c) is defined.

[Equation 1]

$$X = 1 - 10^{-A1/\lambda^4/10} \quad (1a)$$

$$Y = 1 - 10^{-A2/\lambda^4/10} \quad (1b)$$

$$K = \left| 5 \log_{10}\left(\frac{X}{Y}\right) + 10 \log_{10}\left(\frac{B2}{B1}\right) \right| \quad (1c)$$

At this time, the method of forming an optical transmission line according to the present invention forms the optical transmission line by: selecting at least one of the first optical fiber and second optical fiber such that the first and second optical fibers satisfy the relationships that the value of the parameter K represented by the above equations (1a) to (1c) is 0.2 dB or less and that the absolute value of the difference between A1 and A2 is larger than 0.03 dB/km/μm$^4$; and optically connecting the first optical fiber and second optical fiber satisfying the relationships. Additionally, the method of forming an optical transmission line according to the present invention may form the optical transmission line by: selecting at least one of the first optical fiber and second optical fiber such that the first and second optical fibers satisfy the relationships that the value of the parameter K represented by the above equations (1a) to (1c) is 0.2 dB or less and that the value of ratio (B2/B1) is 0.97 or less; and optically connecting the first optical fiber and second optical fiber satisfying the relationships. In addition, the optical transmission line formation method according to the present invention may form the optical transmission line by: selecting at least one of the first optical fiber and second optical fiber such that the first and second optical fibers satisfy the relationships that the value of the parameter K represented by the above equations (1a) to (1c) is 0.2 dB or less, and that the absolute value of the difference between A1 and A2 is larger than 0.08 dB/km/μm$^4$, and that the value of ratio (B2/B1) is 0.97 or less; and optically connecting the first optical fiber and second optical fiber satisfying the relationships.

Preferably, the optical transmission line according to the present invention includes the first optical fiber and second optical fiber connected to each other, and the first and second optical fibers satisfy the relationships that the value of the parameter K represented by the above equations (1a) to (1c) is 0.2 dB or less and that the absolute value of the difference between A1 and A2 is larger than 0.03 dB/km/μm$^4$. Additionally, the first and second optical fibers constructing the optical transmission line may satisfy the relationships that the value of the parameter K represented by the above equations (1a) to (1c) is 0.2 dB or less and that the value of ratio (B2/B1) is 0.97 or less. In addition, the first and second optical fibers constructing the optical transmission line may satisfy the relationships that the value of the parameter K represented by the above equations (1a) to (1c) is 0.2 dB or less, and that the absolute value of the difference between A1 and A2 is larger than 0.08 dB/km/μm$^4$, and that the value of ratio (B2/B1) is 0.97 or less.

In the optical transmission line according to the present invention, it is preferable that the first and second optical fibers satisfy the relationships that the error of the connection loss measurement according to the OTDR test (the absolute value of the difference between the average value β of the measurement values β1 and β2 of the resultant connection loss where a pulse test light is incident from the two ends of the optical transmission line, and the one measurement value/1) is 0.2 dB or less and that the absolute value of the difference between A1 and A2 is larger than 0.03 dB/km/μm$^4$. Additionally, the first and second optical fibers may satisfy the relationships that the error of the connection loss measurement according to the OTDR test is 0.2 dB or less and that the value of ratio (B2/B1) is 0.97 or less. In addition, the first and second optical fibers may satisfy the relationships that the error of the connection loss measurement according to the OTDR test is 0.2 dB or less, and that the absolute value of the difference between A1 and A2 is larger than 0.08 dB/km/μm$^4$, and that the value of ratio (B2/B1) is 0.97 or less.

Now, the parameter K represented by the following equations (2a) to (2c) is defined instead of the above equations (1a) to (1c).

[Equation 2]

$$X = 1 - 10^{-(\alpha 1 - 0.02)/10} \quad (2a)$$

$$Y = 1 - 10^{-(\alpha 2 - 0.02)/10} \quad (2b)$$

$$K = \left| 5 \log_{10}\left(\frac{X}{Y}\right) + 10 \log_{10}\left(\frac{B2}{B1}\right) \right| \quad (2c)$$

In this case, the method of forming an optical transmission line according to the present invention also may form the optical transmission line by: selecting at least one of the first optical fiber and second optical fiber such that the first and second optical fibers satisfy the relationships that the value of the parameter K represented by the above equations (2a) to (2c) is 0.2 dB or less and that the absolute value of the difference between α1 and α2 is larger than 0.03/λ$^4$dB/km or more; and optically connecting the first optical fiber and second optical fiber satisfying the relationships. Additionally, the optical transmission line formation method according to the present invention may form the optical transmission line by: selecting at least one of the first optical fiber and second optical fiber such that the first and second optical fibers satisfy the relationships that the value of the parameter K represented by the above equations (2a) to (2c) is 0.2 dB or less, and that the absolute value of the difference between α1 and α2 is larger than 0.08/λ$^4$dB/km or more, and that the value of ratio (B2/B1) is 0.97 or less; and optically connecting the first optical fiber and second optical fiber satisfying the relationships.

On the other hand, in the optical transmission line according to the present invention, the first and second optical fibers satisfy the relationships that the value of the parameter K represented by the above equations (2a) to (2c) is 0.2 dB or less and that the absolute value of the difference between α1 and α2 is larger than 0.03/λ$^4$dB/km or more. Additionally, the first and second optical fibers constructing the optical transmission line may satisfy the relationships that the value of the parameter K represented by the above equations (2a) to (2c) is 0.2 dB or less, and that the absolute value of the difference between α1 and α2 is larger than 0.08/λ$^4$dB/km or more, and that the value of ratio (B2/B1) is 0.97 or less.

Furthermore, in the optical transmission line according to the present invention, the first and second optical fibers may satisfy the relationships that the error of the connection loss measurement according to the OTDR test is 0.2 dB or less and that the absolute value of the difference between α1 and α2 is larger than 0.03/λ$^4$dB/km or more. Additionally, the first and second optical fibers constructing the optical transmission line may satisfy the relationships that the error of the connection loss measurement according to the OTDR test is 0.2 dB or less, and that the absolute value of the difference between α1 and α2 is larger than 0.08/λ$^4$dB/km or more, and that the value of ratio (B2/B1) is 0.97 or less.

When the parameter K is defined by the above equations (1a) to (1c), in the optical transmission formation method and the transmission line according to the present invention, preferably, the Rayleigh scattering coefficient A1 of the first optical fiber is in the range of 0.94dB/km/μm$^4$ to 1.00 dB/km/μm$^4$, the Rayleigh scattering coefficient A2 of the second optical fiber is in the range of 0.84dB/km/μm$^4$ to 0.90 dB/km/μm$^4$, the mode field diameter B1 of the first optical fiber at the wavelength of 1310 nm is in the range of 9.0 μm to 9.5 μm, and the mode field diameter B2 of the second optical fiber at the wavelength of 1310 nm is in the range of 8.3 μm to 9.0 μm. In addition, in the optical fiber constructing part of the optical transmission line (optical fiber according to the present invention), preferably, the Rayleigh scattering coefficient is in the range of 0.84dB/km/μm$^4$ to 0.90 dB/km/μm$^4$, the mode field diameter B1 at the wavelength of 1310 nm is in the range of 8.3 μm to 9.0 μm. Incidentally, the cladding region of the optical fiber is preferably doped with fluorine.

On the other hand, when the parameter K is defined by the above equations (2a) to (2c), in the optical transmission formation method and the transmission line according to the present invention, at the wavelength of 1310 nm, the transmission loss α1 of the first optical fiber is in the range of 0.32 dB/km to 0.35 dB/km, the transmission loss α2 of the second optical fiber is in the range of 0.28 dB/km to 0.32 dB/km, the mode field diameter B1 of the first optical fiber is in the range of 9.0 μm to 9.5 μm, and the mode field diameter B2 of the second optical fiber is in the range of 8.3 μm to 9.0 μm. Additionally, in the optical fiber according to the present invention, preferably, at the wavelength of 1310 nm, the transmission loss is in the range of 0.28 dB/km to 0.32 dB/km, and the mode field diameter is in the range of 8.3 μm to 9.0 μm. Incidentally, the cladding region of the optical fiber is preferably doped with fluorine.

Besides, in the optical transmission formation method or the transmission line according to the present invention, the value of the parameter K defined by the above equations (1a) to (1c) or equations (2a) to (2c) is preferably 0.1 dB or less. In contrast, when part of the transmission line according to the present invention is constructed by a general optical fiber for transmission (a single mode optical fiber capable of high-quality multiplex transmission at the wavelength of 1.3 μm wavelength band), the optical fiber according to the present invention preferably has the transmission loss of 0.28 dB/km or more but 0.32 dB/km or less at the wavelength of 1310 nm, and the mode field diameter of 8.3 μm or more but 9.0 μm or less at the wavelength of 1310 nm.

Effect of the Invention

As described above, in accordance with the present invention, an optical transmission line capable of measuring more precise connection losses at low cost can be constructed.

BRIEF DESCRIPTION OF THE DRAWINGS

FIG. 1 is a view showing the construction of an optical transmission system according to the present invention;

FIG. 2 is a view showing contour lines of the parameter K on a two-dimensional plane formed by the difference (A1−A2) and ratio (B2/B1);

[FIG. 3] FIG. 3 is a table specifying the respective data of samples 1-12 prepared as the optical transmission line 10 according to the present invention;

FIG. 4 is a view showing contour lines of the parameter K on a two-dimensional plane formed by the difference (α1−α2) and ratio (B2/B1);

[FIG. 5] FIG. 5 is a table specifying the respective data of samples 13-20 prepared as the optical transmission line according to the present invention;

FIG. 6 illustrates a cross-sectional view and a refractive index profile for explaining a structure of an optical fiber according to the present invention;

FIG. 7 is a graph showing the wavelength dependence of the transmission loss of the optical fiber according to the present invention;

FIG. 8 is a graph showing the wavelength dependence of the chromatic dispersion of the optical fiber according to the present invention;

FIG. 9 is a process flow chart for explaining a manufacturing method of samples prepared as an optical fiber according to the present invention;

[FIG. 10] FIG. 10 is a table specifying various characteristics of each of the aforementioned sample A and comparative example A;

FIG. 11 is a graph showing the wavelength dependence of the transmission loss of the optical fiber of each of the sample A and comparative example A;

FIG. 12 is a graph showing the chromatic dispersion characteristics of the optical fiber according to the present invention based on the chromatic dispersion characteristics of the standard single mode optical fiber prescribed in the international standard (ITU-T G.652) as a reference;

[FIG. 13] FIG. 13 is a table specifying various characteristics of the optical fibers of each of the samples B to I and comparative example B;

FIG. 14 is a graph representing the positions of (MFD, $\lambda_{cc}$) of the respective optical fibers of the samples B to F and the comparative example B and also representing the equi-chromatic-dispersion curves at the wavelength of 1550 nm on the two-dimensional space defining the mode field diameter MFD at the wavelength of 1310 nm as the abscissa and the cable cutoff wavelength $\lambda_{cc}$ as the ordinate; and

FIG. 15 is a graph representing the positions of (MFD, $\lambda_{cc}$) of the respective optical fibers of the samples B to F and the comparative example B and also representing the equi-dispersion slopes at the wavelength of 1550 nm on the two-dimensional space defining the mode field diameter MFD at the wavelength of 1310 nm as the abscissa and the cable cutoff wavelength $\lambda_{cc}$ as the ordinate.

EXPLANATION OF THE REFERENCE SYMBOLS

10 . . . optical transmission line;
11 . . . first optical fiber;
12 . . . second optical fiber;
13 . . . connection point;
20 . . . optical transmitter;
30 . . . optical receiver;
100 . . . optical fiber;
110 . . . core region; and
120 . . . cladding region.

BEST MODE OF CARRYING OUT THE INVENTION

In the following, the best modes for carrying out the inventions will be explained in detail with reference to FIGS. 1-15. In the explanation of the drawings, the same elements will be denoted by the same reference symbols and these redundant descriptions will be omitted.

Figure 1:
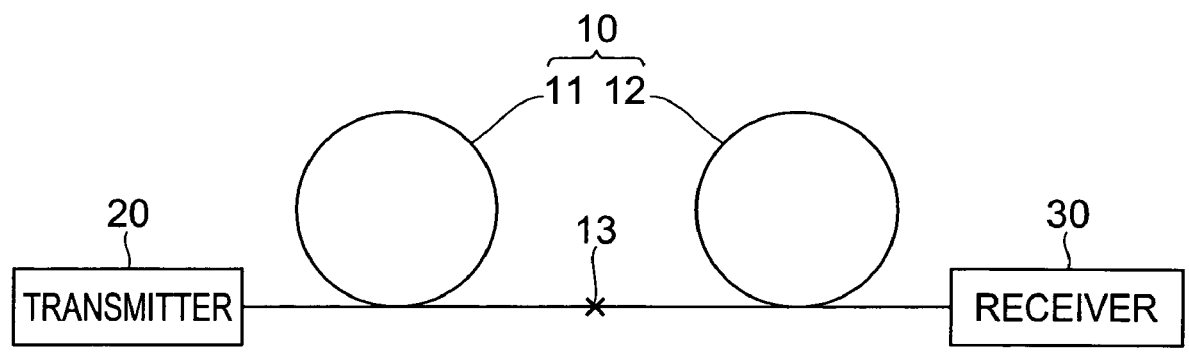
[FIG. 1]

FIG. 1 is a view showing the construction of an optical transmission system including an optical transmission line according to the present invention. In the optical transmission system shown in FIG. 1, an optical transmission line 10 is underlaid between an optical transmitter 20 and an optical receiver 30. In the optical transmission line 10, a first optical fiber 11 and a second optical fiber 12 are fusion-spliced with each other.

In the optical transmission system, a signal light transmitted from the optical transmitter 20 propagates the first optical fiber 11 and second optical fiber 12 in turn and then reaches the optical receiver 30. In this case, the wavelength $\lambda$ of the signal light is included in the wavelength range of 1260 nm to 1625 nm. Note that multiplexed signal light may be transmitted by a plurality of channels included in this wavelength range.

The first optical fiber 11 and second optical fiber 12 each may be underlaid between the optical transmitter 20 and optical receiver 30, and may be modified to a module in a state rolled in a coil form.

For example, the first optical fiber 11 is a fiber for transmission having a positive chromatic dispersion at the wavelength $\lambda$, while the second optical fiber 12 is a dispersion compensation optical fiber having a negative chromatic dispersion at the wavelength $\lambda$. In this case, since the absolute value of the accumulated chromatic dispersion of the whole optical transmission line 10 is reduced, and thus the deterioration of the waveform of the signal light transmitted through the optical transmission line 10 is suppressed, which is preferable upon transmitting a large capacity of information at high speed.

In addition, for example, the first optical fiber 11 may be a typical optical fiber for transmission, while the second optical fiber 12 may be an optical fiber for amplification that optically amplifies the signal light. The second optical fiber 12 may be an optical fiber for amplification doped with Er elements, or may be an optical fiber for Raman amplification. In this case, the signal light transmitted from the optical transmitter 20 is subjected to some losses during propagating the first optical fiber 11, but is amplified during propagating the second optical fiber 12. For this reason, in the optical transmission line including the optical fiber for amplification, the whole transmission loss is reduced, which is adapted for long-haul transmission.

Besides, for instance, when the optical transmission line is also changed and extended, there are some cases that a new optical transmission line will be constructed in such a manner that other optical fibers are spliced to existing optical fibers.

In a case where such an optical transmission line 19 is constructed, the first optical fiber 11 and second optical fiber different in type from each other are fusion-spliced. Whether the splicing work is favorably made or not is determined based on the magnitude of the connection loss at the spliced or connection point 13 measured by an OTDR test. In general, since the measurement value of the connection loss can contain some errors in a case where a pulse test light is merely incident on the optical transmission line 10 from one end of the optical transmission line 10 (e.g., the side of the optical transmitter 20) on the OTDR test, there are some cases unable to obtain a precise value of the connection loss. The optical transmission line 10 and optical transmission line formation method according to the present invention is capable of solving such problems as explained below.

The transmission loss $\alpha$ (db/km) of the optical fiber depends on the wavelength $\lambda$ (μm), and is represented by the following equation (3). The first term on the right side of the equation (3) represents a loss caused by Rayleigh scattering, the third term represents an ultraviolet absorption loss, the fourth term represents an infrared absorption loss, and the fifth term represents an absorption loss due to impurities. Assuming that the third, fourth and fifth terms on the right side are small to a negligible level, the equation (3) is approximated by the following equation (4).

[Equation 3]

$$\alpha(\lambda)=A/\lambda^4 B+C_1\exp(C_2/\lambda)+D_1\exp(-D_2/\lambda)+E(\lambda) \quad (3)$$

[Equation 4]

$$\alpha(\lambda)=A/\lambda^4+B \quad (4)$$

When the actual transmission loss $\alpha(\lambda)$ of the optical fiber is subjected to fitting by the above equation (4), the coefficient A of the first term on the right side in the above equation (4) is defined as the Rayleigh scattering coefficient of the optical fiber. Then, the Rayleigh scattering coefficient of the first optical fiber 11 is A1 (dB/km/μm$^4$); in the wavelength $\lambda$(μm), the mode field diameter of the first optical fiber 11 is B1; the transmission loss of the first optical fiber 11 is $\alpha$1 (dB/km). In addition, the Rayleigh scattering coefficient of the second optical fiber 12 is A2 (dB/km/μm$^4$); in the wavelength $\lambda$ (μm), the mode field diameter of the second optical fiber 12 is B2; the transmission loss of the second optical fiber 12 is $\alpha$2 (dB/km).

From the above equation (4), the ratio X scattered by the Rayleigh scattering of the first optical fiber 11 is represented by the following equation (5a), while the ratio Y scattered by the Rayleigh scattering of the second optical fiber 12 is represented by the following equation (5b). Then, as shown in the following equation (5c), a parameter K is defined by use of the equations (5a) and (5b).

[Equation 5]

$$X = 1 - 10^{-A1/\lambda^4/10} \quad (5a)$$

$$Y = 1 - 10^{-A2/\lambda^4/10} \quad (5b)$$

$$K = \left|5\log_{10}\left(\frac{X}{Y}\right) + 10\log_{10}\left(\frac{B2}{B1}\right)\right| \quad (5c)$$

At this time, the first and second optical fibers 11, 12 constituting the optical transmission line 10 satisfy the relationships that the value of the parameter K represented by the above equations (5a) to (5c) is 0.2 dB or less, and that the absolute value of the difference between A1 and A2 is larger than 0.03 dB/km/μm$^4$. In addition, the above first and second optical fibers 11, 12 may satisfy the relationships that the value of the parameter K represented by the above equations (5a) to (5c) is 0.2 dB or less and that the value of the ratio (B2/B1) is 0.97 or less. Furthermore, the first and second optical fibers 11, 12 may satisfy the following relationships: the value of the parameter K represented by the above equations (5a) to (5c) is 0.2 dB or less; the absolute value of the difference between A1 and A2 is larger than 0.08 dB/km/μm$^4$; and the value of the ratio (B2/B1) is 0.97 or less. More preferably, the value of the parameter K is 0.1 dB or less.

Further, the first and second optical fibers 11, 12 constituting the optical transmission line 10 may satisfy the relationships that the error of the measurement of the connection loss according to the OTDR test is 0.2 dB or less, and that the absolute value of the difference between A1 and A2 is larger than 0.03 dB/km/μm$^4$. Alternatively, the above first and second optical fibers 11, 12 may satisfy the relationships that the error of the measurement of the connection loss according to the OTDR test is 0.2 dB or less, and that the value of the ratio (B2/B1) is 0.97 or less. The first and second optical fibers 11, 12 may satisfy the following relationships: the error of the measurement of the connection loss according to the OTDR test is 0.2 dB or less; the absolute value of the difference between A1 and A2 is larger than 0.08 dB/km/μm$^4$; and the value of the ratio (B2/B1) is 0.97 or less. More preferably, the value of the parameter K is 0.1 dB or less.

As one example of the first and second optical fiber 11, 12 satisfying the following relationships: the value of the parameter K represented by the above equations (5a) to (5c) is 0.2 dB or less; the absolute value of the difference between A1 and A2 is larger than 0.08 dB/km/μm$^4$; and the value of the ratio (B2/B1) is 0.97 or less, the following first optical fiber 11 and second optical fibers 12 are specified. Namely, the Rayleigh scattering coefficient A1 of the first optical fiber 11 is 0.980 dB/km/μm$^4$ in the typical value, 0.995 dB/km/μm$^4$ in the maximum value, 0.965 dB/km/μm$^4$ in the minimum value, while the mode field diameter B1 of the first optical fiber 11 at the wavelength of 1550 nm is 10.40 μm in the typical value, 10.55 μm in the maximum value, and 10.25 μm in the maximum value. On the other hand, the Rayleigh scattering coefficient A2 of the second optical fiber 12 is 0.870 dB/km/μm$^4$ in the typical value, 0.885 dB/km/u m$^4$ in the maximum value, 0.855 dB/km/μm$^4$ in the minimum value, while the mode field diameter B2 of the second optical fiber 12 at the wavelength of 1550 nm is 9.80 μm in the typical value, 9.95 μm in the maximum value, and 9.65 μm in the minimum value. At this time, the minimum value of the difference between A1 and A2 is 0.08 dB/km/μm$^4$ and the maximum value of the ratio (B2/B1) is 0.97.

Now, the parameter K represented by the following equations (6a) to (6c) substituting for the above equations (5a) to (5c) will be defined. In these equations, the loss according to terms other than the first term on the right side in the equation (1) is set to 0.02 dB/km.

[Equation 6]

$$X = 1 - 10^{-(\alpha 1 - 0.02)/10} \quad (6a)$$

$$Y = 1 - 10^{-(\alpha 2 - 0.02)/10} \quad (6b)$$

$$K = \left| 5 \log_{10}\left(\frac{X}{Y}\right) + 10 \log_{10}\left(\frac{B2}{B1}\right) \right| \quad (6c)$$

At this time, the first and second optical fibers 11, 12 composing the optical transmission line 10 satisfy the relationships that the value of the parameter K represented by the above equations (6a) to (6c) is 0.2 dB or less, and that the absolute value of the difference between α1 and α2 is 0.03/λ$^4$dB/km or more. In addition, the above first and second optical fibers 11, 12 satisfy the following relationships: the value of the parameter K represented by the above equations (6a) to (6c) is 0.2 dB or less; the absolute value of the difference between α1 and α2 is 0.08/λ$^4$dB/km or more; and the value of the ratio (B2/B1) is 0.97 or less. More preferably, the value of the parameter K is 0.1 dB or less.

Also, the first and second optical fibers 11, 12 composing the optical transmission line 10 may satisfy the relationships that the error of the measurement of the connection loss according to the OTDR test is 0.2 dB or less, and that the absolute value of the difference between α1 and α2 is larger than 0.03/λ$^4$dB/km. Here, the above first and second optical fibers 11, 12 may satisfy the following relationships: the error of the measurement of the connection loss according to the OTDR test is 0.2 dB or less; the absolute value of the difference between α1 and α2 is 0.08/λ$^4$dB/km or more; and the value of the ratio (B2/B1) is 0.97 or less. More preferably, the value of the parameter K is 0.1 dB or less.

In the optical transmission line formation method according to the present invention, at least one of the first optical fiber 11 and second optical fibers 12 is selected so that the first and second optical fibers 11, 12 satisfy the aforementioned relationships; the optical transmission line 10 is constructed by connecting the first optical fiber 11 and second optical fiber 12 satisfying the above relationships.

Where the parameter K is defined by the above equations (5a) to (5c), in the optical transmission line formation method or the optical transmission line 10 according to the present invention, preferably, the Rayleigh scattering coefficient A1 of the first optical fiber 11 is in the range of 0.94dB/km/μm$^4$ to 1.00 dB/km/μm$^4$, the Rayleigh scattering coefficient A2 of the second optical fiber 12 is in the range of 0.84dB/km/μm$^4$ to 0.90 dB/km/μm$^4$, the mode field diameter B1 of the first optical fiber 11 at the wavelength of 1310 nm is in the range of 9.0 μm to 9.5 μm, and the mode field diameter B2 of the second optical fiber 12 at the wavelength of 1310 nm is in the range of 8.3 μm to 9.0 μm. Additionally, it is preferable that the cladding region of the second optical fiber 12 is doped with fluorine.

On the other hand, where the parameter K is defined by the above equations (6a) to (6c), in the optical transmission line formation method or the optical transmission line 10 according to the present invention, at the wavelength of 1310 nm, preferably, the transmission loss α1 of the first optical fiber 11 is in the range of 0.32 dB/km to 0.35 dB/km, the transmission loss α2 of the second optical fiber 12 is in the range of 0.28 dB/km to 0.32 dB/km, the mode field diameter B1 of the first optical fiber 11 at the wavelength of 1310 nm is in the range of 9.0 μm to 9.5 μm, and the mode field diameter B2 of the second optical fiber 12 at the wavelength of 1310 nm is in the range of 8.3 μm to 9.0 μm. Additionally, it is preferable that the cladding region of the second optical fiber 12 is doped with fluorine.

As described above, in the optical transmission line 10 and optical transmission formation method, even when a pulse test light is incident from only one end side of the optical transmission line 10 to carry out the OTDR test, a more precise connection loss can be measured.

Figure 2:
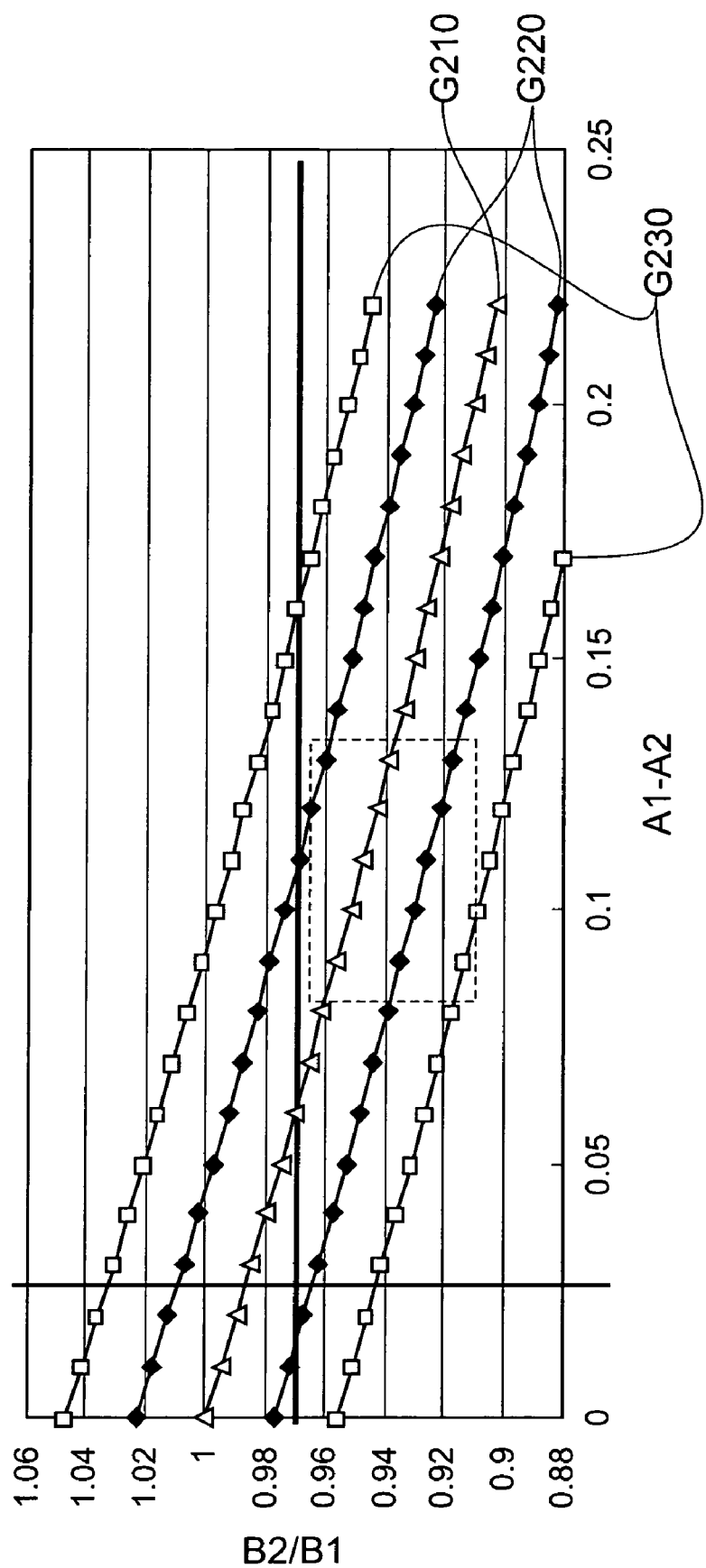
[FIG. 2]

FIGS. 2 and 3 show the measurement results and examples where the wavelength λ is 1550 nm. FIG. 2 is a view showing contour lines of the parameter K on a two-dimensional plane formed by the difference (A1−A2) and ratio (B2/B1). In FIG. 2, graph G210 represents a contour line of K=0 dB, graph G220 represents a contour line of K=0.1 dB, and graph G230 represents a contour line of K=0.2 dB independently. On the other hand, FIG. 3 is a table specifying the respective data of samples 1-12 prepared as the optical transmission line 10 according to the present invention. In FIG. 3, for each sample, Rayleigh scattering coefficient A1 of the first optical fiber 11, Rayleigh scattering coefficient A2 of the second optical fiber 12, difference (A1−A2), mode field diameter B1 of the first optical fiber 11, mode field diameter B2 of the second optical fiber 12, ratio (B2/B1) and value of the parameter K represented by the above equations (5a) to (5c) or error of measurement of connection loss are shown.

Figure 4:
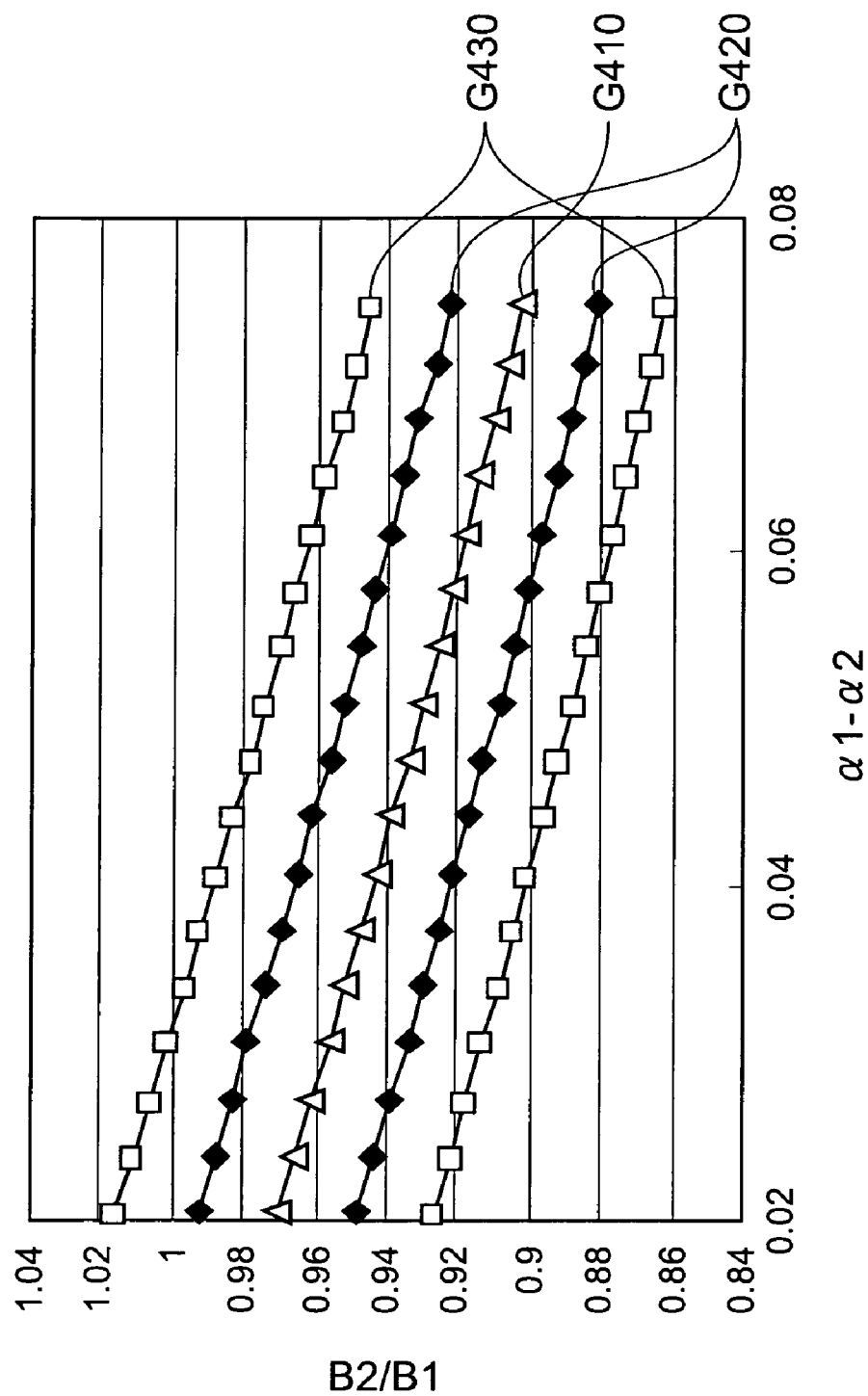
[FIG. 4]

Further, FIGS. 4 and 5 show the measurement results and examples where the wavelength λ is 1310 nm. FIG. 4 is a view showing contour lines of the parameter K on a two-dimensional plane formed by the difference (α1−α2) and ratio (B2/B1). In FIG. 4, graph G410 represents a contour line of K=0 dB, graph G420 represents a contour line of K=0.1 dB, and graph G430 represents a contour line of K=0.2 dB independently. On the other hand, FIG. 5 is a table specifying the respective data of samples 13-20 prepared as the optical transmission line according to the present invention. In FIG. 5, for each sample, transmission loss α1 of the first optical fiber 11, transmission loss α2 of the second optical fiber 12, difference (α1−α2), mode field diameter B1 of the first optical fiber 11, mode field diameter B2 of the second optical fiber 12, ratio (B2/B1) and value of the parameter K represented by the above equations (6a) to (6c) or error of measurement of connection loss are shown.

In any of these samples, the value of the parameter K or error of measurement of connection loss represented by the above equations (5a) to (5c) or equations (6a) to (6c) is 0.2 dB or less. Additionally, for several samples, the value of the parameter K or error of measurement of connection loss is 0.1 dB or less.

Embodiments of optical fibers applicable to the foregoing optical transmission line (optical fibers according to the present invention) will next be explained in detail with reference to FIGS. 6-15 independently. The optical fiber (optical fiber according to the present invention) is an optical fiber that is excellent in compatibility with standard single mode optical fibers prescribed by the international standard (ITU-T G.652)(high quality multiplex transmission is possible at 1.3 μm wavelength band), and that is adapted for signal transmission in a broader band enabling high quality multiplex transmission at 1.55 μm wavelength band also. In particular, the optical fiber explained below is applicable as the second optical fiber 12 enabling the connection at a lower loss where the first optical fiber 11 in the optical transmission line 10 is constructed by a standard single mode optical fiber.

Figure 6:
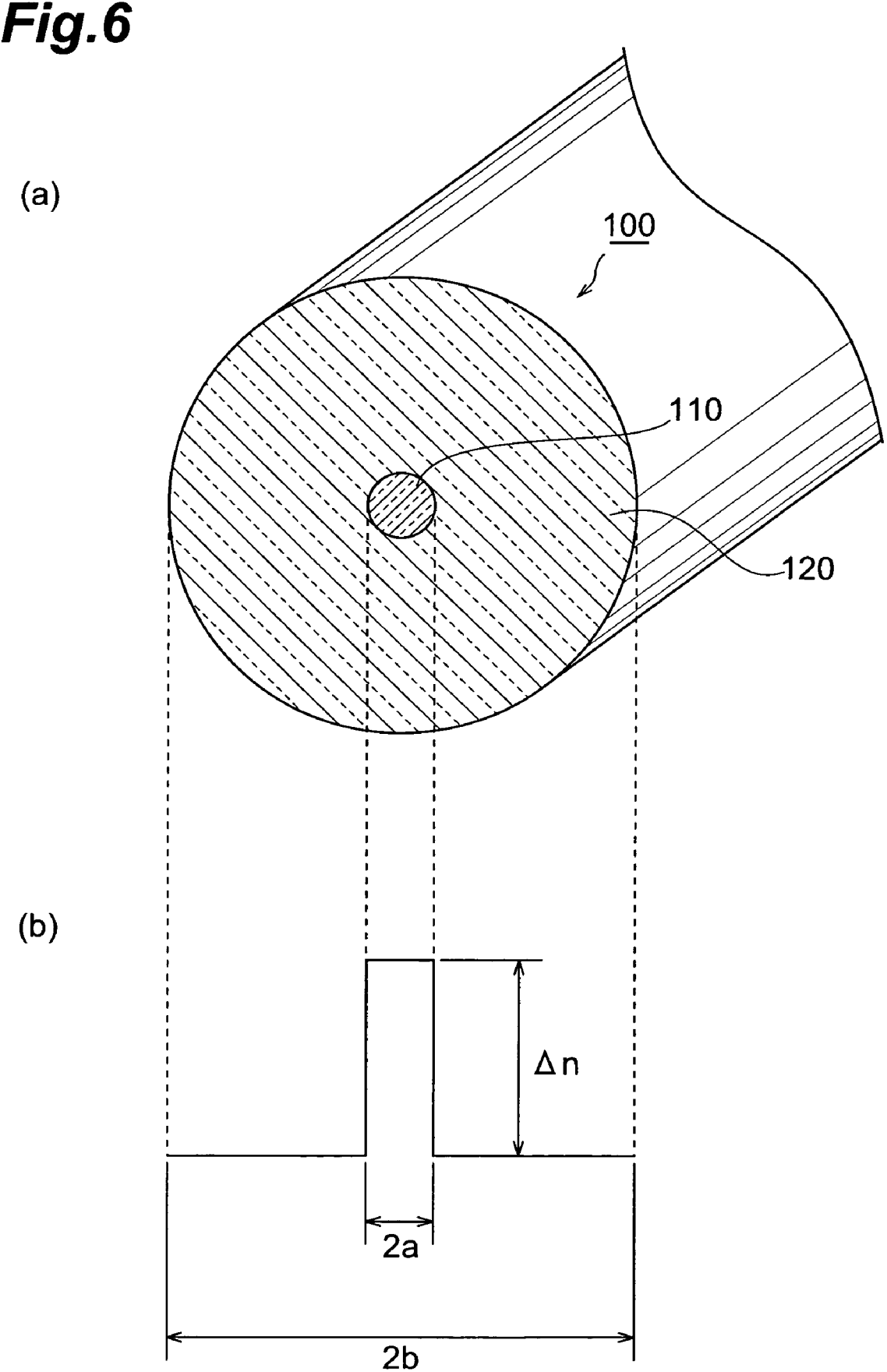
[FIG. 6]

FIG. 6 is a view for explaining a structure of an optical fiber according to the present invention; the area (a) in FIG. 6 is a view showing a cross-sectional structure perpendicular to the optical axis of the optical fiber 100, while the area (b) in FIG. 6 is a refractive index profile of the optical fiber 100. As shown in the area (a) of FIG. 6, the optical fiber 100 comprises a core region 110 having a circular section and an outer diameter of 2a at the center, and a cladding region 120 surrounding the outer periphery of the core region 110. In the refractive index profile of the optical fiber 100 shown in FIG. 6(b), the relative refractive index difference of the core region 110 with respect to the cladding region 120 is Δn.

The optical fiber 100 is mainly comprised of silica glass, preferably, pure silica glass having the cladding region 120 doped with fluorine and the core region 110 not doped with GeO$_2$. In this case, it is fairly convenient for reduction of the transmission loss. Note that the cable cutoff wavelength of the optical fiber 100 is 1260 nm or less.

Figure 7:
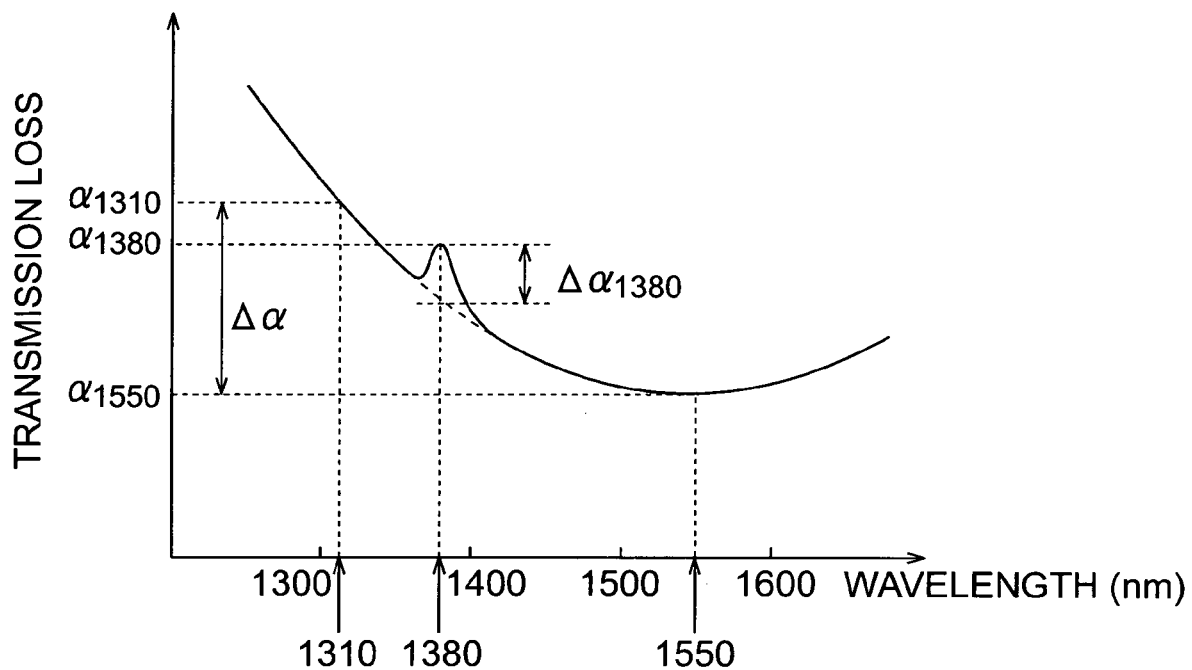
[FIG. 7]

FIG. 7 is a graph showing the wavelength dependence of the transmission loss of the optical fiber according to the present invention. Since the optical fiber 100 is mainly comprised of silica glass, the transmission loss thereof exhibits the minimum in the vicinity of the wavelength of 1550 nm as shown in FIG. 7. Note that the transmission loss at the wavelength of 1550 nm is denoted by $\alpha_{1550}$. In the optical fiber 100, the transmission loss $\alpha_{1310}$ at the wavelength of 1310 nm is 0.32 dB/km or less, while the increase of loss $\Delta\alpha_{1380}$ caused by OH-radical at the wavelength of 1380 nm is 0.3 dB/km or less.

In the optical fiber 100, the transmission loss $\alpha_{1310}$ at the wavelength of 1310 nm is small, and the increase of loss $\Delta\alpha_{1380}$ caused by OH-radical at the wavelength of 1380 nm is also small. Further, in the optical fiber 100, the cable cut-off wavelength is 1260 nm or less; therefore, in the broad signal wavelength band from O-band to L-band, low-loss and single mode transmission of a signal light will be ensured.

In the optical fiber 100, it is more preferable where the transmission loss $\alpha_{1310}$ at the wavelength of 1310 nm is 0.30 dB/km or less; in this case, the signal light in the vicinity of the wavelength of 1310 nm can be transmitted over a long distance at further low loss.

In the optical fiber 100, it is preferable that the transmission loss $\alpha_{1380}$ at the wavelength of 1380 nm is smaller than the transmission loss $\alpha_{1310}$ at the wavelength of 1310 nm. In this case, it is convenient to transmit the signal light in the vicinity of the wavelength of 1380 nm over a long distance at low loss.

In the optical fiber 110, it is preferable that the value $\Delta\alpha(=\alpha_{1380}-\alpha_{1310})$ subtracting the transmission loss $\alpha_{1550}$ at the wavelength of 1550 nm from the transmission loss $\alpha_{1310}$ at the wavelength of 1310 nm the transmission loss $\alpha_{1310}$ at the wavelength of 1310 nm is 0.13 dB/km or less. In this case, the difference in transmission loss between the two wavelengths is small, thereby achieving signal light transmission with a uniform performance over a broad signal wavelength band.

Figure 8:
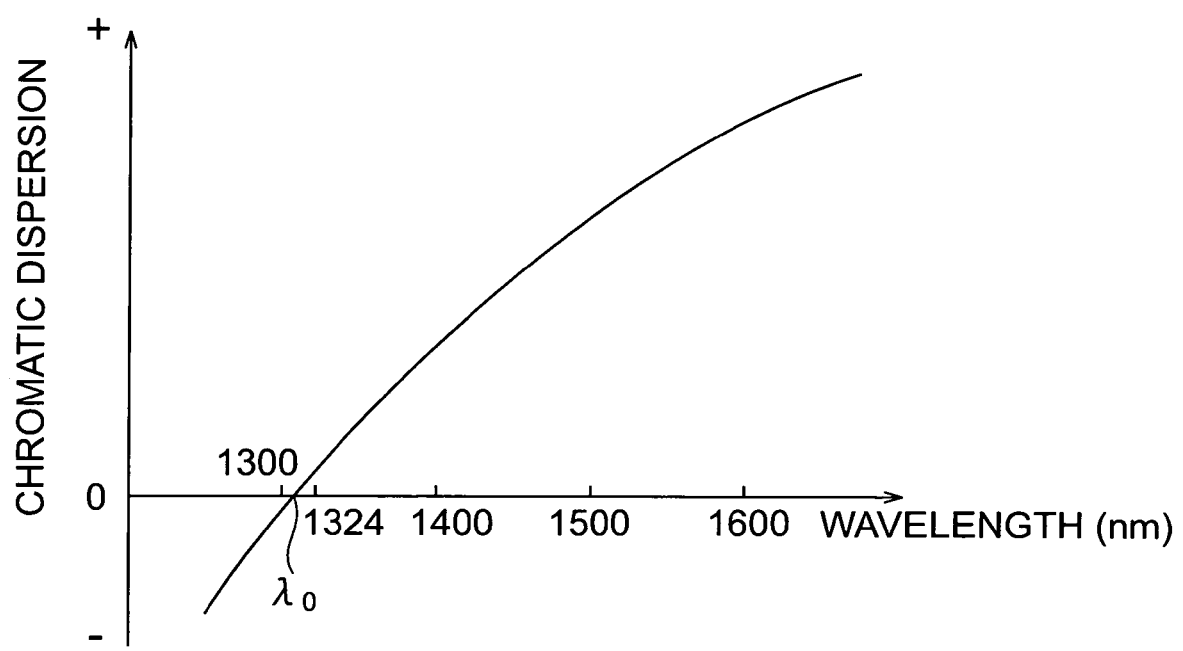
[FIG. 8]

FIG. 8 is a graph showing the wavelength dependence of the chromatic dispersion of the optical fiber according to the invention. As shown in FIG. 8, the longer the wavelength, the larger the chromatic dispersion of the optical fiber 10. In addition, the zero dispersion wavelength $\lambda_0$ of the optical fiber 100 is 1300 nm or more and 1324 nm or less. In this case, the zero dispersion wavelength of the optical fiber 100 is the same level as the zero dispersion one of standard single mode optical fibers; therefore, the optical fiber 100 is excellent in compatibility with the standard single mode optical fiber, which is convenient for dispersion compensation.

Further, in the optical fiber 100, it is preferable that the polarization mode dispersion at the wavelength of 1550 nm is 0.5 ps/km$^{1/2}$ or less. In this case, the deterioration of the signal light transmission performance caused by the polarization mode dispersion where a high-bit-rate transmission is conducted can be reduced. In addition, in the optical fiber 100, it is preferable that the bending loss in the bending diameter of 20 mm at the wavelength of 1550 nm is 3 dB/m or less. In this case, the increase of the loss caused by microbends can be reduced when it is rolled in a coil form or drawn out. In addition, in the optical fiber 100, it is preferable that the Petermann-I mode field diameter at the wavelength of 1550 nm is 10.0 μm or less. In this case, the increase of the loss caused by microbends upon the application as a cable can be reduced.

A first sample (sample A) prepared as an optical fiber according to the present invention will next be explained together with a first comparative example (comparative example A).

The optical fiber of the sample A has a sectional structure and a refractive index profile shown in FIG. 6, having a core region comprised of pure silica glass and a cladding region comprised of fluorine-doped silica glass. The outer diameter 2a of the core region is 7.9 μm, and the outer diameter 2b of the cladding region is 125 μm. In addition, the relative refractive index difference Δn of the core region defining the refractive index of the cladding region as a reference is 0.39%. In contrast, the optical fiber according to the comparative example A is a standard single mode optical fiber, having a core region comprised of $GeO_2$-doped silica glass and a cladding region comprised of pure silica glass.

Figure 9:
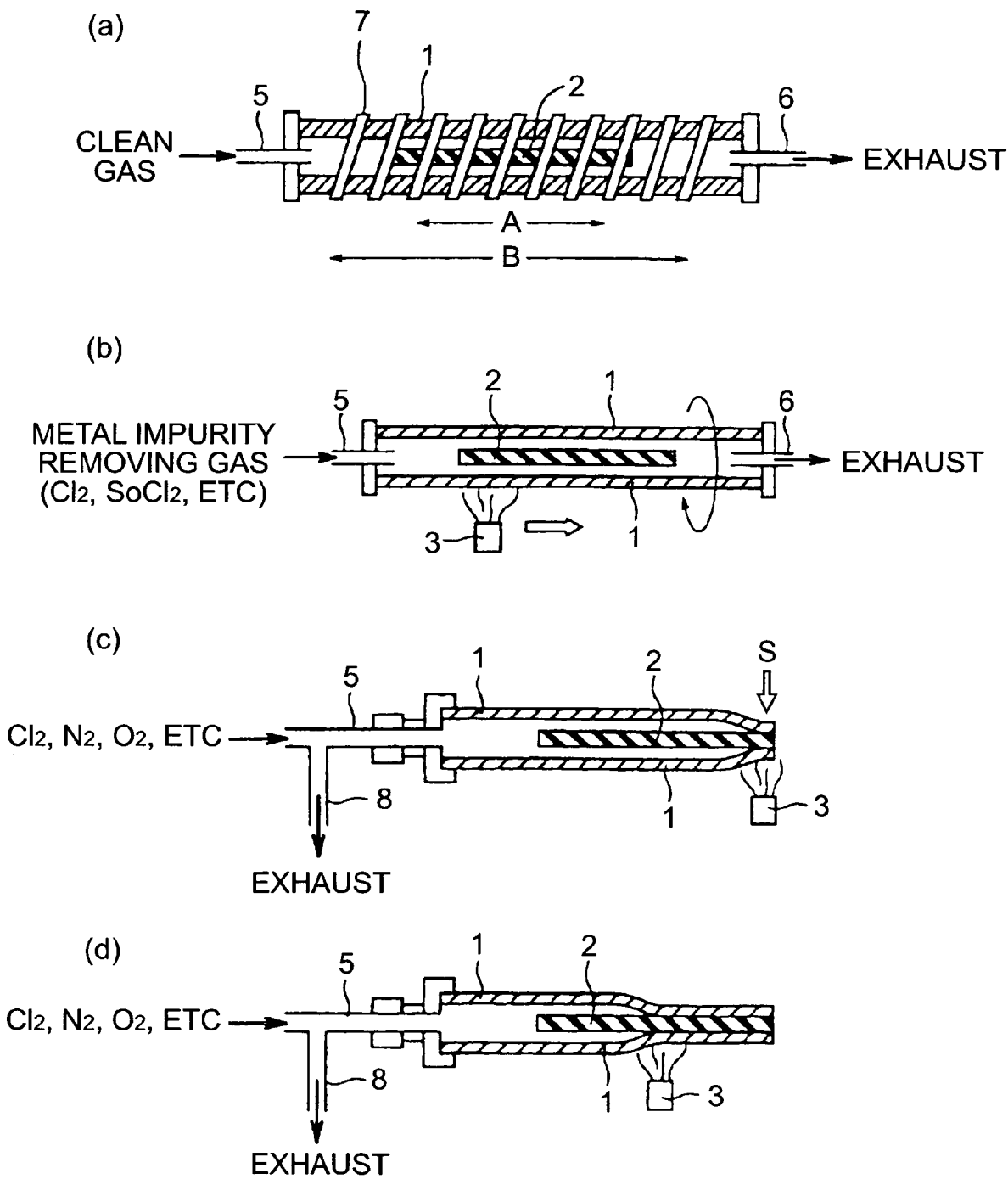
[FIG. 9]

The optical fiber of the sample A is manufactured by a manufacturing method explained below. Namely, FIG. 9 is a process flow chart for explaining a manufacturing method of each sample prepared as an optical fiber according to the present invention. In the manufacturing process shown in FIG. 9, a high-purity silica glass rod is first synthesized by a VAD method; the glass rod is extended in a heating furnace at the temperature of approximately 2000 degrees centigrade (C); then, the glass rod 2 having 3 mm in outer diameter and 50 cm in length is produced. Additionally, a glass pipe 1 comprised of fluorine-doped silica glass having a relative refractive index difference of −0.39% with respect to pure silica glass is produced by a VAD method. Note that the glass pipe 1 has 20 mm in outer diameter and 6 mm in inner diameter.

Then, as shown in the area (a) of FIG. 9, in a state that the glass rod 2 is inserted into the glass pipe 1 rolled by a tape heater 7, a pure $N_2$ gas ($H_2O$ content is 0.5 vol ppm or less; the content of other H-containing gases is 0.1 vol ppm or less) is flown into the glass pipe 1 from a pipe 5 on the first end side of the glass pipe 1 by a flow rate 2000 cc/min (hereinafter, referred to as 'sccm') in standard state (zero degree centigrade, 1 atm) conversion. On the other hand, the inside of the glass pipe 1 is evacuated from a pipe 6 of the second end side, and the inner pressure of the glass pipe 1 is set to 2.5 kPa. At this time, in each of impurity removing, sealing and solidifying processes appeared later, the region A is not only heated at the temperature of 550 degrees centigrade or higher in each of the glass pipe 1 and glass rod 2, but also the region B including the portion of 200 mm in length on the two outer sides of the region A is heated at the temperature 200 of degrees centigrade by the tape heater 7. The heated region B is set to include the region to be heated at the temperature of 550 degrees centigrade at the later solidifying process. This condition is retained during four hours, and the above pure N2 gas is blown therein and exhausted therefrom.

Subsequently, as shown in the area (b) of FIG. 9, a metal impurity removing gas (e.g., $Cl_2$, $SOCl_2$) is introduced into the glass pipe 1 from the pipe 5 on the first end side of the glass pipe 1, and the glass pipe 1 and glass rod 2 is heated at the temperature of 1150 degrees centigrade by a heating source 3. In this way, metal impurities adhered to the surface of the inner wall of the glass pipe 1 and the surface of the glass rod 2 respectively will be removed.

Further subsequently, as shown in the area (c) of FIG. 9, the second end side of the glass pipe 1 is heat-melted by the heating source 3 to thus fuse the glass pipe 1 and glass rod 2, and the region denoted by arrow S is sealed. Then, the inside of the glass pipe 1 is evacuated in vacuum state at the atmosphere of 0.01 kPa or less by a vacuum pump through a gas line 8 that is an exhaust pipe. Thereafter, a pure $N_2$ gas ($H_2O$ content is 0.5 vol ppm or less; the content of other H-containing gases is 0.1 vol ppm or less) from the pipe 5 on the first end side of the glass pipe 1 is introduced into the glass pipe 1. At this time, when the vacuum pump is stopped, the inside of the glass pipe 1 is pressured at the atmosphere of 106 kPa. When three cycles of these evacuation and pressure are repeated, gases (mainly, $H_2O$) adsorbed on the inner wall side of the glass pipe 1 and the surface of the glass rod 2 are detached.

Then, as shown in the area (d) of FIG. 9, when the heat source 3 is displaced from the second end side of the grass pipe 1 toward the first end side thereof in turn, the glass pipe 1 and glass rod 2 are heat-melted and solidified (rod-in-collapse method). At this time, a $Cl_2$ gas of 500 sccm and an $O_2$ gas of 500 sccm are introduced into the gas pipe 1. Additionally, the inner pressure of the glass pipe 1 is −1 kPa in gauge pressure, and the temperature of the outer surface of the glass pipe 1 is 1600 degrees centigrade during the solidification. A first preform can be obtained through the aforementioned processes.

The first preform is 19 mm in outer diameter and 400 mm in length, and the ratio of cladding diameter to core diameter is 6.6. Further, when the first preform is extended, a second preform having 14 mm in outer diameter is obtained. On the outer peripheral surface of the second preform having 14 mm in outer diameter, $SiO_2$ particles obtained where $SiCl_4$ is introduced into $H_2/O_2$ flame is deposited up to 120 mm in outer diameter. The thus resultant deposit is further heated at the temperature of 800 degrees centigrade in a furnace. Note that the temperature of the furnace is climbed up to 1500 degrees centigrade at the temperature rising speed of 33° C./min. In the meantime, a He gas of 15000 sccm and an $SF_6$ gas of 450 sccm are introduced into the furnace. In this manner, a fiber preform will be obtained. Then, when the fiber preform is drawn, the samples of the optical fiber according to the present invention can be obtained.

Figure 11:
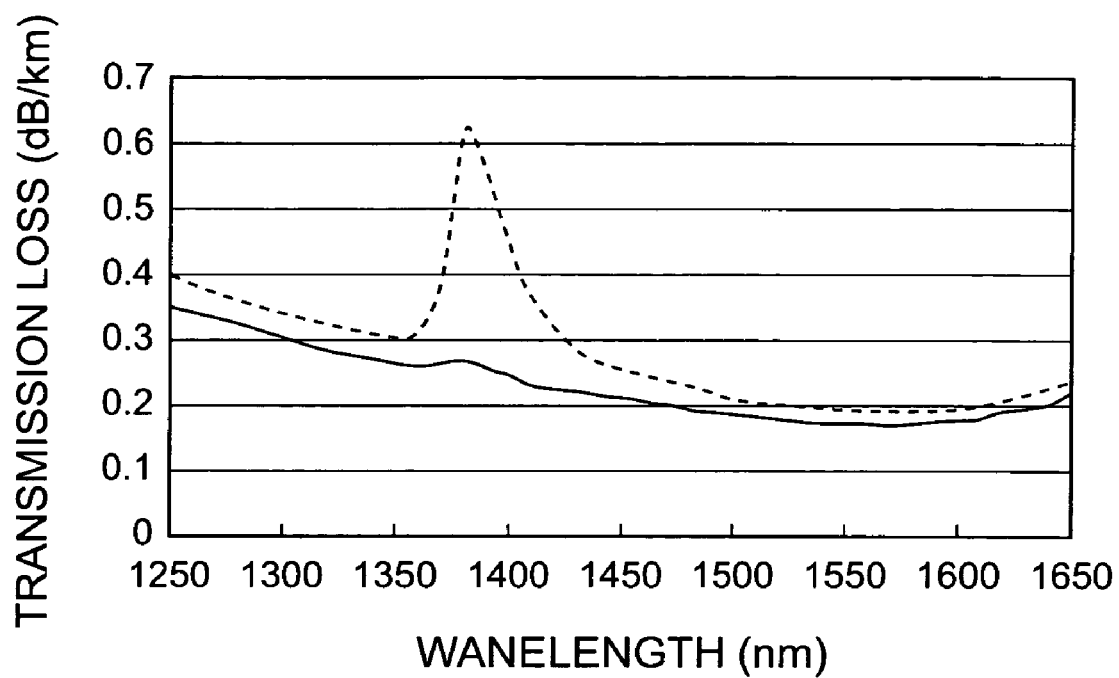
[FIG. 11]

FIG. 10 is a table specifying various characteristics of each of the aforementioned sample A and comparative example A. In addition, FIG. 11 is a graph showing the wavelength dependence of the transmission loss of the optical fiber of each of the sample A and comparative example A. Note that in FIG. 11, the solid line represents the transmission loss of the optical fiber according to the sample A, while the broken line represents the transmission loss of the optical fiber according to the comparative example A.

As can be seen from FIGS. 10 and 11, in the optical fiber of the comparative example A, the transmission loss $α_{1310}$ at the wavelength of 1310 nm is 0.33 dB/km, the transmission loss $α_{1380}$ at the wavelength of 1380 nm is 0.62 dB/km, the transmission loss $α_{1550}$ at the wavelength of 1550 nm is 0.19 dB/km, the loss difference $Δα(=α_{1550}−α_{1310})$ is 0.14dB/km, and the increase of loss $Δα_{1380}$ caused by OH-radical at the wavelength of 1380 nm is 0.31 dB/km.

On the other hand, in the optical fiber of the sample A, the transmission loss $α_{1310}$ at the wavelength of 1310 nm is 0.29 dB/km, the transmission loss $α_{1380}$ at the wavelength of 1380 nm is 0.27 dB/km, the transmission loss $α_{1550}$ at the wavelength of 1550 nm is 0.17 dB/km, the loss difference $Δα$ is 0.12 dB/km, and the increase of loss $Δα_{1380}$ caused by OH-radical at the wavelength of 1380 nm is 0.03 dB/km.

In addition, in the optical fiber of the sample A, the cable cutoff wavelength is 1220 nm, the zero dispersion wavelength is 1310 nm, the mode field diameter at the wavelength of 1550 nm is 9.7 μm, the bending loss at 20 mm in bending diameter at the wavelength of 1550 nm is 2 dB/m.

Further, in the optical fiber of the sample A, non-circularization of each of the core and cladding regions is suppressed sufficiently; the polarization mode dispersion at the wavelength of 1550 nm is 0.1 $ps/km^{1/2}$ or less in a bobbin-rolled state, and 0.03 ps/km$^{1/2}$ or less in a bundle state reducing the outer force.

The second to ninth samples (sample B to I) prepared as an optical fiber according to the present invention will now be explained in detail while comparing with the second example (comparative example B).

It is noted that the samples B to I prepared as an optical fiber according to the present invention have a sectional structure and refractive index profile shown in FIG. 6. Namely, the optical fiber of each of the samples B to I has a core region of 2a in outer diameter, and a cladding region surrounding the outer periphery of the core region. The refractive index of the core region is higher than that of the cladding region, and the relative refractive index difference Δn of the core region is positive with respect to the refractive index of the cladding region as a reference.

The optical fibers 1 of these samples B to I each is mainly comprised of silica glass, and an additive for refractive index adjustment is doped in both or either of the core region and cladding region. The core region may be doped with $GeO_2$, while the cladding region may be comprised of pure silica glass; however, the core region is preferably comprised of pure silica glass not doped with $GeO_2$, while the cladding region is doped with fluorine. The transmission loss of the resultant optical fiber can be reduced by such a composition.

Figure 12:
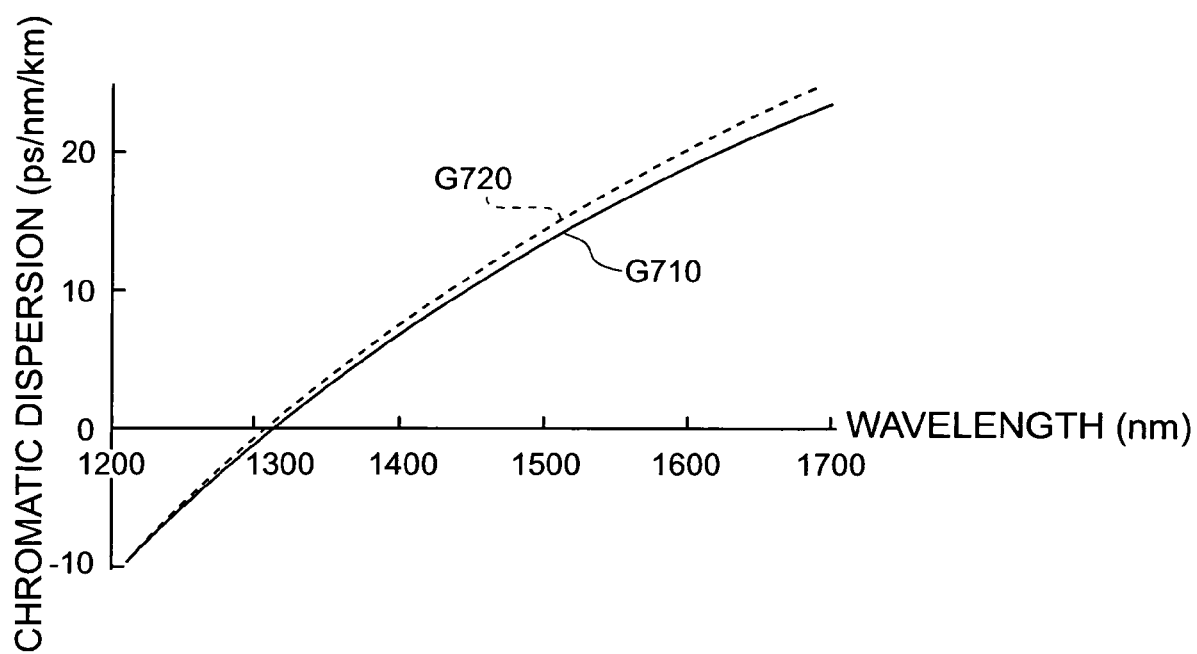
[FIG. 12]

FIG. 12 is a graph showing the chromatic dispersion characteristics of the optical fiber according to the present invention based on the chromatic dispersion characteristics of the standard single mode optical fiber prescribed in the international standard (ITU-T G.652) as a reference. Additionally, in FIG. 12, graph G710 represents the chromatic dispersion characteristics of the optical fiber according to the present invention, while graph G720 represents the chromatic dispersion characteristics of the standard single mode optical fiber prescribed in the international standard (ITU-T G.652).

In the optical fiber, the zero dispersion wavelength exists in the vicinity of the wavelength of 1300 nm, similarly to the standard single mode optical fiber, and the dispersion slope is positive in the range of the wavelength of 1200 nm to 1700 nm. However, in the optical fiber, as compared with the standard single mode optical fiber, the chromatic dispersion is small in the chromatic dispersion in the wavelength of 1550 nm, and the dispersion slope is also small.

In particular, in the optical fiber according to the present invention, the dispersion slope at the wavelength of 1550 nm is 0.055 ps/nm$^2$/km or less, and the chromatic dispersion at the wavelength of 1550 nm is 16 ps/nm/km or less, more preferably 16 ps/nm/km or less. Additionally, in the optical fiber according to the present invention, the cable cutoff wavelength is 1260 nm or less, and the mode field diameter at the wavelength of 1310 nm is 9 µm or less.

Alternatively, in the optical fiber according to the present invention, the mode field diameter at the wavelength of 1310 nm is 9 µm or less, while the dispersion slope at zero dispersion wavelength is 0.082 ps/nm$^2$/km or less, more preferably 0.080 ps/nm$^2$/km or less.

When such an optical fiber is applied as an optical transmission line, a high-quality signal transmission becomes possible in the case of the transmission of a multiplex signal light at 1.55 µm wavelength band. In addition, the optical fiber is excellent in compatibility with the standard single mode optical fiber prescribed in the international standard (ITU-T G.652). That is, similarly to the case of the optical communication system where conventional single mode optical fibers are applied to an optical transmission line, the design and establishment of the optical communication system where the optical fiber according to the present invention is applied to the optical transmission line is possible. Additionally, the establishment of the optical communication system mixing the conventional single mode optical fiber and the optical fiber according to the present invention is possible.

Besides, in the optical fiber according to the present invention, the transmission loss at the wavelength of 1550 nm is preferably 0.176 dB/km or less. This is because an optical transmission line making a long-haul transmission of a signal light at 1.55 µm wavelength band without relay can be established. Further, preferably, the transmission loss at wavelength 1310 nm is 0.32 dB/km or less, and the increase of loss caused by OH-radical at the wavelength of 1380 nm is 0.3 dB/km or less. In this case, it is possible to establish an optical transmission line making a long-haul transmission without relay of a broad-band signal light including the 1.55 µm wavelength band, in addition to the 1.55 µm wavelength. In addition, when the zero dispersion wavelength is in the range of 1300 nm to 1324 nm, an excellent compatibility can be obtained with the standard single mode optical fiber prescribed in the international standard (ITU-T G.652).

Figure 14:
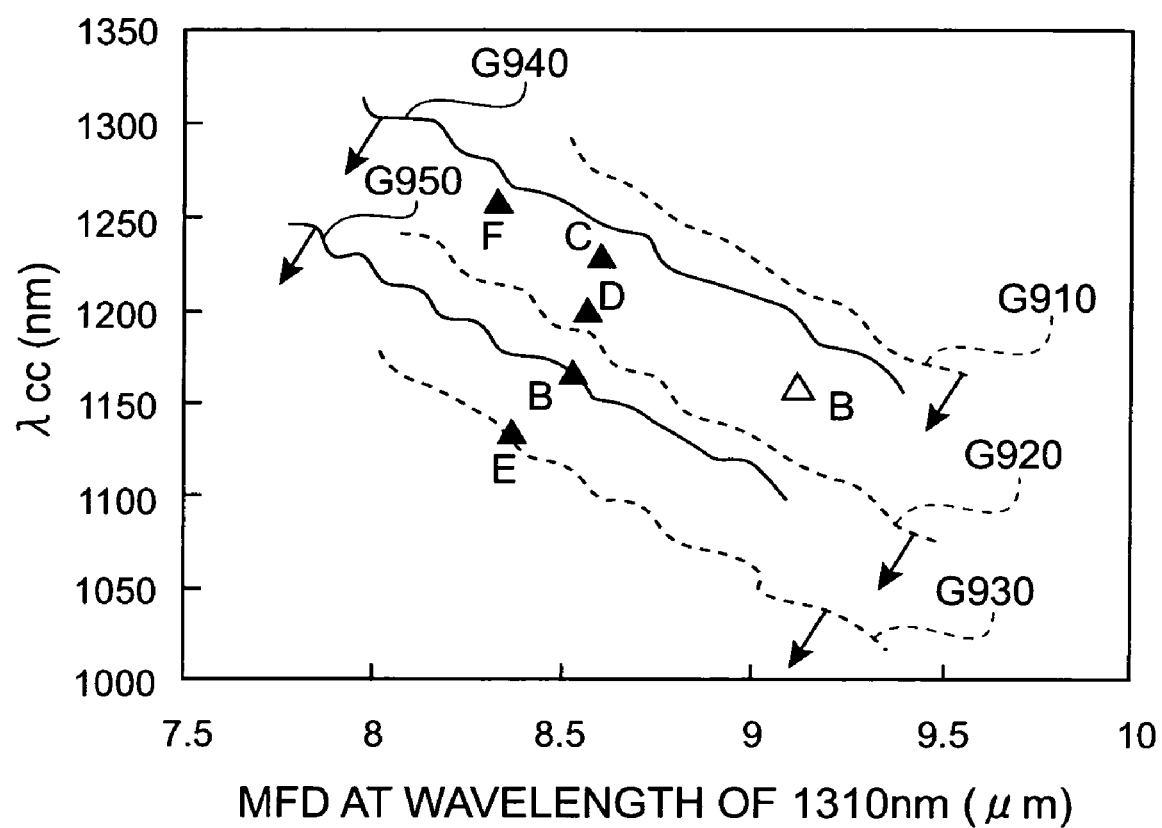
[FIG. 14]
Figure 15:
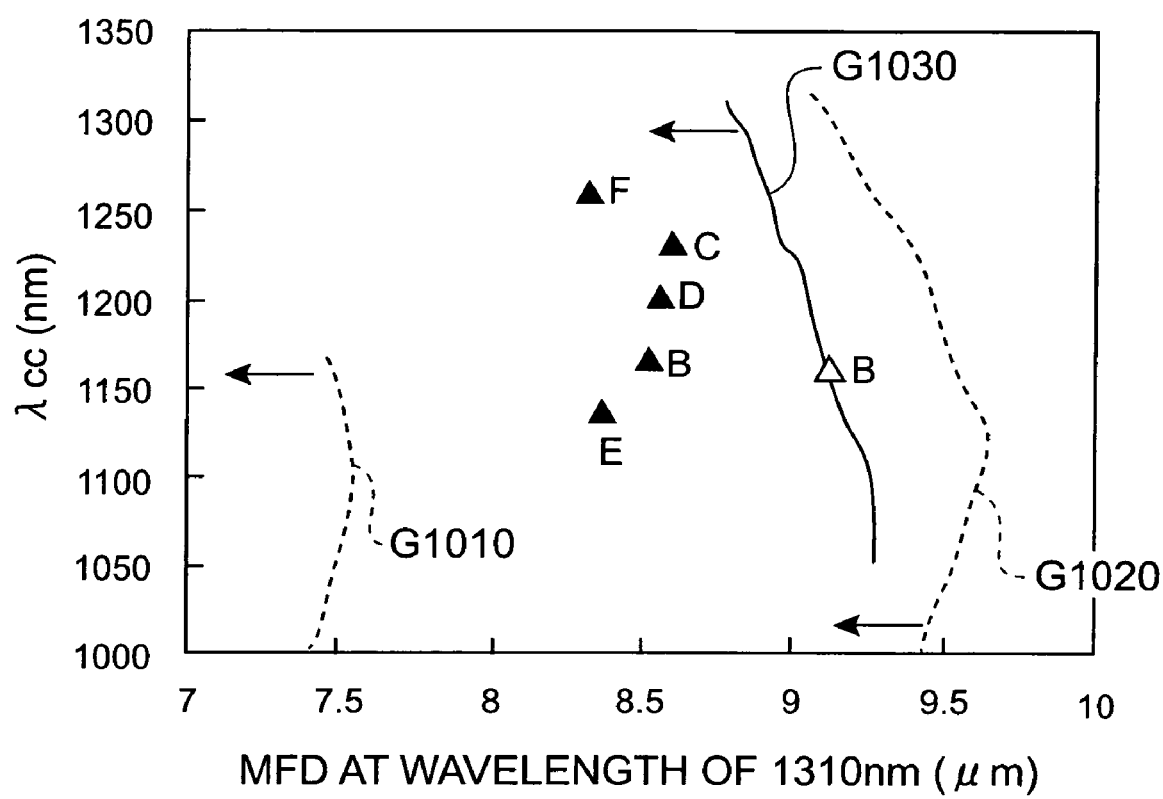
[FIG. 15]

Referring to FIGS. 13 to 15, the second to ninth samples prepared as the optical fibers according to the present invention will next be explained. FIG. 13 is a table specifying various characteristics of the optical fibers of each of the samples B to I and comparative example B. The optical fiber of each of the samples B to I has a sectional structure and refractive index profile shown in FIG. 6. Namely, the core region is comprised of pure silica glass, while the cladding region is comprised of silica glass doped with fluorine. On the other hand, the optical fiber of the comparative example B is the single mode optical fiber based on the international standard (ITU-T G.652); the core region is comprised of silica glass doped with $GeO_2$, while the cladding region is comprised of pure silica glass.

With respect to each optical fiber of the samples B to I and the comparative example B, FIG. 13 represents relative refractive index difference Δn (%), core diameter 2a (µm), cable cutoff wavelength (nm), mode field diameter (µm) at the wavelength of 1310 nm, zero dispersion wavelength (nm), chromatic dispersion (ps/nm/km) at the wavelength of 1550 nm, dispersion slope (ps/nm$^2$/km) at the wavelength of 1550 nm, zero dispersion slope (ps/nm$^2$/km), transmission loss (dB/km) at the wavelength of 1310 nm, transmission loss (dB/km) at the wavelength of 1380 nm, increase of loss (dB/km) caused by OH-radical at the wavelength of 1380 nm, transmission loss (dB/km) at the wavelength of 1550 nm, and fiber structure.

Namely, in the optical fiber of the sample B, the relative refractive index difference Δn is 0.38%, the core diameter 2a is 7.80 µm, the cable cutoff wavelength is 1166 nm, the mode field diameter at the wavelength of 1310 nm is 8.53 µm, the zero dispersion wavelength is 1318 nm, the chromatic dispersion at the wavelength of 1550 nm is 14.97 ps/nm/km, the dispersion slope at the wavelength of 1550 nm is 0.0540 ps/nm$^2$/km, the zero dispersion slope is 0.0793 ps/nm$^2$/km.

In the optical fiber of the sample C, the relative refractive index difference Δn is 0.395%, the core diameter 2a is 8.16 µm, the cable cutoff wavelength is 1230 nm, the mode field diameter at the wavelength of 1310 nm is 8.60 µm, the zero dispersion wavelength is 1313 nm, the chromatic dispersion at the wavelength of 1550 nm is 15.46 ps/nm/km, the dispersion slope at the wavelength of 1550 nm is 0.0544 ps/nm$^2$/km, the zero dispersion slope is 0.0806 ps/nm$^2$/km.

In the optical fiber of the sample D, the relative refractive index difference Δn is 0.39%, the core diameter 2a is 8.02 μm, the cable cutoff wavelength is 1200 nm, the mode field diameter at the wavelength of 1310 nm is 8.57 μm, the zero dispersion wavelength is 1313 nm, the chromatic dispersion at the wavelength of 1550 nm is 15.39 ps/nm/km, the dispersion slope at the wavelength of 1550 nm is 0.0537 ps/nm²/km, the zero dispersion slope is 0.0801 ps/nm²/km.

In the optical fiber of the sample E, the relative refractive index difference Δn is 0.395%, the core diameter 2a is 7.56 μm, the cable cutoff wavelength is 1135 nm, the mode field diameter at the wavelength of 1310 nm is 8.37 μm, the zero dispersion wavelength is 1318 nm, the chromatic dispersion at the wavelength of 1550 nm is 14.86 ps/nm/km, the dispersion slope at the wavelength of 1550 nm is 0.0531 ps/nm²/km, the zero dispersion slope is 0.0789 ps/nm²/km.

In the optical fiber of the sample F, the relative refractive index difference Δn is 0.42%, the core diameter 2a is 7.60 μm, the cable cutoff wavelength is 1260 nm, the mode field diameter at the wavelength of 1310 nm is 8.33 μm, the zero dispersion wavelength is 1307 nm, the chromatic dispersion at the wavelength of 1550 nm is 15.75 ps/nm/km, the dispersion slope at the wavelength of 1550 nm is 0.0536 ps/nm²/km, the zero dispersion slope is 0.0816 ps/nm²/km.

In the optical fiber of the sample G, the relative refractive index difference Δn is 0.385%, the core diameter 2a is 8.14 μm, the cable cutoff wavelength is 1184 nm, the mode field diameter at the wavelength of 1310 nm is 8.72 μm, the zero dispersion wavelength is 1312 nm, the chromatic dispersion at the wavelength of 1550 nm is 15.90 ps/nm/km, the dispersion slope at the wavelength of 1550 nm is 0.0547 ps/nm²/km, the zero dispersion slope is 0.0800 ps/nm²/km.

In the optical fiber of the sample H, the relative refractive index difference Δn is 0.38%, the core diameter 2a is 8.52 μm, the cable cutoff wavelength is 12.26 nm, the mode field diameter at the wavelength of 1310 nm is 8.92 μm, the zero dispersion wavelength is 1304 nm, the chromatic dispersion at the wavelength of 1550 nm is 16.66 ps/nm/km, the dispersion slope at the wavelength of 1550 nm is 0.0548 ps/nm²/km, the zero dispersion slope is 0.0819 ps/nm²/km.

In the optical fiber of the sample I, the relative refractive index difference Δn is 0.36%, the core diameter 2a is 8.10 μm, the cable cutoff wavelength is 1133 nm, the mode field diameter at the wavelength of 1310 nm is 8.92 μm, the zero dispersion wavelength is 1317 nm, the chromatic dispersion at the wavelength of 1550 nm is 15.39 ps/nm/km, the dispersion slope at the wavelength of 1550 nm is 0.0544 ps/nm²/km, the zero dispersion slope is 0.0790 ps/nm²/km.

It is noted that in any of the optical fibers of the samples B to F, the transmission loss at the wavelength of 1310 nm is 0.32 dB/km or less, the transmission loss at the wavelength of 1380 nm is 0.31 dB/km or less, the increase of loss caused by OH-radical at the wavelength of 1380 nm is 0.10 dB/km or less, the transmission loss at the wavelength of 1550 nm is 0.176 dB/km or less. Additionally, any of the optical fibers has pure silica core and fluorine-doped cladding.

On the other hand, in the optical fiber of the comparative example B, the cable cutoff wavelength is 1158 nm, the mode field diameter at the wavelength of 1310 nm is 9.13 μm, the zero dispersion wavelength is 1316 nm, the chromatic dispersion at the wavelength of 1550 nm is 16.50 ps/nm/km, the dispersion slope at the wavelength of 1550 nm is 0.0584 ps/nm²/km, the zero dispersion slope is 0.0850 ps/nm²/km. In addition, the transmission loss at the wavelength of 1310 nm is 0.33 dB/km or less, the transmission loss at the wavelength of 1380 nm is 0.62 dB/km, the increase of loss caused by OH-radical at the wavelength of 1380 nm is 0.31 dB/km or less, the transmission loss at the wavelength of 1550 nm is 0.19 dB/km or less. The optical fiber of the comparative example B has Ge-doped core and pure silica cladding.

FIG. 14 is a graph representing the positions of (MFD, $\lambda_{cc}$) of the respective optical fibers of the samples B to F and the comparative example B and also representing the equi-chromatic-dispersion curves at the wavelength of 1550 nm on the two-dimensional space defining the mode field diameter MFD at the wavelength of 1310 nm as the abscissa and the cable cutoff wavelength $\lambda_{cc}$ as the ordinate. Note that in FIG. 14, symbols ▲B to ▲F denote the (MFD, $\lambda_{cc}$) of the optical fibers of the samples B to F, while symbol ΔB denotes the (MFD, $\lambda_{cc}$) of the optical fiber of the comparative example B. In addition, graph G910 represents the equi-chromatic-dispersion curve of the standard single mode optical fiber having the chromatic dispersion of 17 ps/nm/km or less, graph G920 represents the equi-chromatic-dispersion curve of the standard single mode optical fiber having the chromatic dispersion of 16 ps/nm/km or less, and graph G930 represents the equi-chromatic-dispersion curve of the standard single mode optical fiber having the chromatic dispersion of 15 ps/nm/km or less. On the other hand, graph G940 represents the equi-chromatic-dispersion curve of the fiber with pure silica core having the chromatic dispersion of 16 ps/nm/km or less, and graph G950 represents the equi-chromatic-dispersion curve of the optical fiber having pure silica core having the chromatic dispersion of 16 ps/nm/km or less.

As can be seen from FIG. 14, as compared with the optical fiber of the comparative example B, in the optical fiber of each sample, the chromatic dispersion is small even if the MFD and $\lambda_{cc}$ are the same.

FIG. 15 is a graph representing the positions of (MFD, $\lambda_{cc}$) of the respective optical fibers of the samples B to F and the comparative example B and also representing the equi-dispersion slopes at the wavelength of 1550 nm on the two-dimensional space defining the mode field diameter MFD at the wavelength of 1310 nm as the abscissa and the cable cutoff wavelength $\lambda_{cc}$ as the ordinate. Note that in FIG. 15, symbols ▲B to ▲F denote the (MFD, $\lambda_{cc}$) of the optical fibers of the samples B to F, while symbol ΔB denotes the (MFD, $\lambda_{cc}$) of the optical fiber of the comparative example B. In addition, graph G1010 represents the equi-dispersion slope curve of the standard single mode optical fiber having the dispersion slope of 0.055 ps/nm²/km or less, and graph G1020 represents the equi-dispersion slope curve of the standard single mode optical fiber having the dispersion slope of 0.059 ps/nm²/km or less. On the other hand, graph G1030 represents the equi-dispersion slope curve of the optical fiber having pure silica core having the dispersion slope of 0.055 ps/nm²/km or less. As can be seen from FIG. 15, as compared with the optical fiber of the comparative example B, in the optical fiber of each sample, the dispersion slope is small even if the MFD and $\lambda_{cc}$ are the same.

As described above, in the aforementioned optical fiber according to the present invention where the mode field diameter MFD at the wavelength of 1310 nm is 9 μm or less, as compared with a $GeO_2$-doped silica-based optical fiber based on the international standard (ITU-T G.652), the chromatic dispersion at the wavelength of 1550 nm and the dispersion slope at the wavelength of 1550 nm are small even if the cable cutoff wavelength $\lambda_{cc}$ and the mode field diameter MFD at the wavelength of 1310 nm are the same.

INDUSTRIAL APPLICABILITY

The optical transmission according to the present invention is applicable to a long-haul transmission line with low loss, and the optical fiber in accordance with the invention is applicable to an optical communication of not only 1.3 μm wavelength band but also 1.55 μm wavelength band as a transmission medium of a WDM optical communication system capable of transmitting signal light with a plurality of channels.

The invention claimed is:

1. An optical fiber mainly comprised of silica glass, comprising a core region extending along a predetermined axis, and a cladding region prepared on an outer periphery of said core region, said fiber having a transmission loss of 0.28 dB/km to 0.32 dB/km at the wavelength of 1310 nm, a mode field diameter of 8.3 μm to 9.0 μm at the wavelength of 1310 nm, a cable cutoff wavelength of 1260 nm or less and an increase of loss of 0.3 dB/km or less caused by OH-radical at the wavelength of 1380 nm, and a bending loss of 3 dB/m or less at the bending diameter of 20 mm at the wavelength of 1550 nm.

2. An optical fiber according to claim 1, wherein the transmission loss at the wavelength of 1310 nm is 0.30 dB/km.

3. An optical fiber according to claim 1, wherein a transmission loss at the wavelength of 1380 nm is lower that the transmission loss at the wavelength of 1310 nm.

4. An optical fiber according to claim 1, wherein the value subtracting a transmission loss at the wavelength of 1550 nm from the transmission loss at the wavelength of 1310 nm is 0.13 dB/km or less.

5. An optical fiber according to claim 1, further having a zero dispersion wavelength in the range of 1300 nm to 1324 nm.

6. An optical fiber according to claim 1, further having a polarization mode dispersion of 0.5 ps/km$^{1/2}$ or less at the wavelength of 1550 nm.

7. An optical fiber according to claim 1, further having a Petermann-I mode field diameter of 10.0 μm or less at the wavelength of 1550 nm.

8. An optical fiber according to claim 1, further having a dispersion slope of 0.055 ps/nm$^2$/km or less at the wavelength of 1550 nm.

9. An optical fiber according to claim 8, further having a chromatic dispersion of 16 ps/nm/km or less at the wavelength of 1550 nm.

10. An optical fiber according to claim 9, wherein the chromatic dispersion at the wavelength of 1550 nm is 15 ps/nm/km or less.

11. An optical fiber according to claim 8, further having a transmission loss of 0.176 dB/km or less at the wavelength of 1550 nm.

12. An optical fiber according to claim 8, further having a transmission loss of 0.32 dB/km or less.

13. An optical fiber according to claim 8, further having a zero dispersion wavelength in the range of 1300 nm to 1324 nm.

14. An optical fiber according to claim 8, wherein said cladding region is doped with fluorine.

15. An optical fiber according to claim 14, wherein said core region does not contain $GeO_2$.

16. An optical fiber according to claim 8, wherein said core region has an outer diameter of 7.5 μm or more but 8.6 μm or less, and a relative refractive index difference of said core region with respect to said cladding region falls within the range of 0.36% to 0.42%.

17. An optical fiber according to claim 1, further having a dispersion slope of 0.082 ps/nm$^2$/km or less at the zero dispersion wavelength.

18. An optical fiber according to claim 17, wherein the dispersion slope at said zero dispersion wavelength is 0.080 ps/nm$^2$/km or less.

19. An optical fiber according to claim 17, further having a transmission loss of 0.176 dB/km or less at the wavelength of 1550 nm.

20. An optical fiber according to claim 17, further having a transmission loss of 0.32 dB/km or less.

21. An optical fiber according to claim 17, further having a zero dispersion wavelength in the range of 1300 nm to 1324 nm.

22. An optical fiber according to claim 17, wherein said cladding region is doped with fluorine.

23. An optical fiber according to claim 22, wherein said core region does not contain $GeO_2$.

24. An optical fiber according to claim 17, wherein said core region has an outer diameter of 7.5 μm or more but 8.6 μm or less, and a relative refractive index difference of said core region to said cladding region falls within the range of 0.36% to 0.42%.

25. An optical fiber according to claim 1, wherein said cladding region is doped with fluorine.

26. An optical fiber according to claim 25, wherein said core region does not contain $GeO_2$.

27. An optical fiber according to claim 1, wherein said core region has an outer diameter of 7.5 μm or more but 8.6 μm or less, and a relative refractive index difference of said core region with respect to said cladding region falls within the range of 0.36% to 0.42%.

* * * * *